United States Patent [19]

Shortway et al.

[11] 4,214,028
[45] Jul. 22, 1980

[54] RESINOUS POLYMER SHEET MATERIALS HAVING SURFACE DECORATIVE EFFECTS AND METHODS OF MAKING THE SAME

[75] Inventors: Harry A. Shortway, Franklin Lakes; Alan A. Graham, Mercerville; Charles H. Miller, Lawrenceville, all of N.J.

[73] Assignee: Congoleum Corporation, Kearny, N.J.

[21] Appl. No.: 5,277

[22] Filed: Jan. 22, 1979

Related U.S. Application Data

[63] Continuation-in-part of Ser. No. 879,171, Feb. 21, 1978, abandoned, and Ser. No. 942,246, Sep. 14, 1978, abandoned.

[51] Int. Cl.² .................... B32B 5/20; B32B 31/22; B32B 31/26
[52] U.S. Cl. .................... 428/159; 156/219; 156/220; 156/240; 156/246; 156/247; 156/277; 264/DIG. 82; 264/52; 427/244; 427/264; 427/270; 427/373; 427/375; 428/172; 428/203; 428/315; 428/522
[58] Field of Search ............ 156/79, 219, 220, 277, 156/246, 247, 240, 270; 428/159, 203, 315, 522, 172; 264/DIG. 82, 52, 321; 427/373, 375, 244, 264, 270

[56] References Cited
U.S. PATENT DOCUMENTS

| | | | |
|---|---|---|---|
| 3,224,894 | 12/1965 | Palmer | 156/79 |
| 3,519,527 | 7/1970 | Crowley | 156/79 |
| 3,660,187 | 5/1972 | Shortway | 156/79 |
| 3,772,138 | 11/1973 | Witman | 156/79 |
| 3,773,545 | 11/1973 | Erb | 427/373 |
| 3,804,933 | 4/1974 | Allan | 264/52 |
| 3,823,214 | 7/1974 | Allan | 264/52 |
| 3,844,814 | 10/1974 | Bettoli | 186/79 |
| 3,887,409 | 6/1975 | McCreary | 156/79 |
| 3,887,678 | 6/1975 | Lewicki | 156/220 |
| 4,012,248 | 3/1977 | Rump | 264/52 |
| 4,017,658 | 4/1977 | Bomboire | 156/79 |
| 4,090,007 | 5/1978 | Crowley | 156/79 |

*Primary Examiner*—Ellis P. Robinson
*Attorney, Agent, or Firm*—Richard T. Laughlin

[57] ABSTRACT

Resinous polymer sheet materials having selective, surface decorative effects comprising:

(1) a base layer or substrate, such as a fibrous backing sheet material and/or a blown or unblown resinous polymer composition having either an embossed or a relatively smooth surface;

(2) a pattern or design printed or otherwise deposited on and adhered to the base layer or substrate, certain portions of the printed pattern or design having certain colors, and other portions of the printed pattern or design having other colors; and (3) a wear layer having an embossed or a relatively smooth surface and containing reactive polymerizable monomers and having certain surface portions provided with a certain texture or effect, such as a flat, dead or dull mat finish, and other surface portions provided with another texture or effect, such as a sleek, glossy or lustrous finish, the interior portions of the wear layer lying under the flat, dead or dull mat finish having a relatively high melt viscosity and containing relatively high concentrations of polymerized and/or cross-linked reactive polymerizable monomers, and the interior portions of the wear layer lying under the sleek, glossy or lustrous finish having either (a) a relatively low melt viscosity and containing substantially no significant or substantial concentrations of polymerized and/or cross-linked reactive polymerizable monomers, or (b) a relatively high melt viscosity and containing relatively high concentrations of polymerized and/or cross-linked reactive polymerizable monomers, (i) the certain colors of the printed pattern or design, and (ii) the flat, dead or dull mat finish areas, and (iii) the interior portions of the wear layer having a relatively high melt viscosity and containing the relatively high concentrations of the polymerized and/or cross-linked reactive polymerizable monomers all being in substantially perfect registry, and (i) the other colors of the printed pattern or design, and (ii) the sleek, glossy or lustrous finish areas, and (iii) the interior portions of the wear layer having a relatively low melt viscosity and containing relatively low or no concentrations of polymerized and/or cross-linked reactive polymerizable monomers also all being in substantially perfect registry.

27 Claims, 15 Drawing Figures

RESINOUS POLYMER SHEET MATERIALS HAVING SURFACE DECORATIVE EFFECTS AND METHODS OF MAKING THE SAME

This patent application is a continuation-in-part of copending patent applications Ser. No. 879,171, filed Feb. 21, 1978 now abandoned and Ser. No. 942,246, filed Sept. 14, 1978 now abandoned.

THE FIELD OF THE INVENTION

The present invention relates to decorative sheet materials, and more particularly to decorative resinous polymer sheet materials having controlled, selective placement of surface decorative effects of use as: floor, wall and ceiling coverings; desk, table and counter tops; surface layers on leather, fabrics, wood, paper, paper products, glass, metals, plastics, etc.; upholstery, drapery, clothing and apparel materials; interiors for cars, trucks, trains, airplanes, and other vehicles or other means of transportation; covers for books, periodicals and other publications; boxes, cartons, containers, and other receptacles; maps, road markers and similar and like articles. Even more particularly, the present invention is concerned with resinous polymer decorative sheet materials having smooth, glossy or lustrous surfaces in some areas; or embossed, dead or dull mat surfaces in other areas; or embossed, glossy or lustrous surfaces in still other areas; or smooth, dead or dull mat surfaces in still further areas; all of such areas sharply contrasting with each other and in perfect registry with a pattern or design printed on such decorative sheet materials.

THE GENERAL BACKGROUND OF THE INVENTION

Decorative sheet materials of a resinous polymer composition have been manufactured for many years and one of the commonest means of creating or enhancing the decorative effects has been to provide selected portions of the surface of such decorative sheet materials with different types of contrasting finishes or effects, or surface gloss or luster differentials, for example, with smooth, glossy or lustrous surfaces; embossed, dead or dull mat surfaces; embossed, glossy or lustrous; and smooth, dead or dull mat surfaces, all sharply contrasting with one another.

Many methods, including differential mechanical embossing, inlaying, or chemical etching, and other methods, have been devised to provide such sharply contrasting surfaces but all of such prior art methods have always left something to be desired. For example, differential mechanical embossing combined with pattern or design printing has always created registration problems and related difficulties. Inlaying and chemical etching methods have normally been costly and process-time consuming.

PURPOSES AND OBJECTS OF THE INVENTION

It is therefore a principal purpose and object of the present invention to provide resinous polymer compositions in sheet material form having selective, surface decorative effects created by the controlled placement of various different surface finishes, embossings, or surface gloss differentials wherein smooth or embossed glossy or lustrous surface areas sharply contrast with each other and with smooth or embossed dead or dull mat finish surfaces, using methods in which registration problems and difficulties are substantially completely eliminated and which methods are neither costly nor process-time consuming.

BRIEF SUMMARY OF THE INVENTION THE PRODUCT ASPECTS

It has been found that such principal purposes and objects, and other principal purposes and objects which will become clear from a further reading and understanding of this disclosure, may be accomplished by providing resinous polymer sheet materials having selective, surface decorative effects comprising: (1) a base layer or substrate, such as a fibrous backing sheet material and/or a blown or unblown resinous sheet polymer composition having an embossed or a relatively smooth surface; (2) a pattern or design printed on and adhered to the base layer or substrate, certain portions of the printed pattern or design having certain colors, and other portions of the printed pattern or design having other colors; and (3) a wear layer containing reactive polymerizable monomers and having certain surface areas provided with a certain texture or effect, such as a dead or dull mat finish, and other surface areas provided with another texture or effect, such as a glossy or lustrous finish, the interior portions of the wear layer lying under the dead or dull mat finish having a relatively high melt viscosity and containing concentrations of polymerized and/or cross-linked reactive polymerizable monomers, and the interior portions of the wear layer lying under the glossy or lustrous finish having a relatively low melt viscosity and containing substantially no significant concentrations of polymerized and/or cross-linked reactive polymerizable monomers, the certain colors of the printed pattern or design, the dead or dull mat finish areas, and the interior portions of the wear layer having a relatively high melt viscosity and containing the polymerized and/or cross-linked reactive polymerizable monomers all being in substantially perfect registry, and the other colors of the printed pattern or design the glossy or lustrous finish areas, and the interior portions of the wear layer having a relatively low melt viscosity and containing no substantial concentrations of polymerized and/or cross-linked polymerizable monomers also all being in substantially perfect registry.

THE METHOD ASPECTS

It has been found that such resinous polymer sheet materials having selective placement of decorative surface effects may be made, for example, by the following simplified and abbreviated illustrative method which comprises; laying down or otherwise forming a base layer or substrate, such as a fibrous backing sheet material and/or a nonfoamable or potentially foamable resinous polymer composition or plastisol, and/or other sheet materials; printing or otherwise depositing on such base layer or substrate a pattern or design in which certain predetermined portions or colors contain a polymerization initiator or catalyst having a certain concentration of activity and in which other predetermined portions or colors either contain a polymerization initiator or catalyst having a different concentration or activity, or else contain no polymerization initiator or catalyst at all; applying to the printed pattern or design a resinous polymer wear layer containing substantially uniformly therein a reactive, polymerizable monomeric material; mechanically embossing or otherwise creating on substantially the entire surface of the wear layer a desired texture or finish, such as a flat, dead or dull mat finish, at a sufficiently elevated temperature, as to activate or decompose the polymerization initiator or catalyst to polymerize and/or cross-link the reactive, polymerizable monomeric material lying in the wear layer directly over the polymerization initiator or catalyst, but not to polymerize and/or cross-link any reactive, polymerizable monomeric materials not lying directly over any polymerization initiator or catalyst. Thus, the polymerization and/or cross-linking of the reactive, polymerizable monomeric materials takes place selectively in the wear layer.

It has been found that such heating to a sufficiently elevated temperature for a sufficient period of time and the accompanying pressure during the mechanical embossing procedure polymerizes and/or cross-links the reactive, polymerizable monomeric materials and also increases the melt viscosity of the wear layer but only in those areas lying directly over the polymerization initiator or catalyst. As a result, in such areas, the mechanically embossed, flat, dead or dull mat finish or texture is better capable of resisting the softening and the melting effects of the elevated temperatures during any subsequent fusion and/or blowing or foaming operations and therefore such areas remain substantially as they were originally mechanically formed in such areas.

But, in those other areas where no polymerization and/or crosslinking of the reactive, polymerizable monomeric materials took place in the resinous wear layer and wherein the melt viscosity thereof did not materially increase, the mechanically embossed flat, dead or dull mat finish or texture is not capable of resisting the softening and melting effects of the elevated temperatures during any subsequent fusion and/or blowing or foaming operations and therefore softens and melts sufficiently as to flow together and form a sleek, glossy or lustrous finish which contrasts sharply with the adjacent flat, dead or dull mat finish of the polymerized and/or cross-linked areas of higher melt viscosities.

It is to be appreciated that the above simplified and abbreviated illustrative method is merely one of several variations capable of making the resinous polymer sheet materials of the present invention; that it is merely illustrative of the broader aspects of the present invention; and that some conventional and standard steps, such as, for example, heating, gelling, cooling, drying, etc., have been omitted for purposes of clarity and brevity.

BRIEF DESCRIPTION OF THE DRAWINGS

In the following specification and accompanying self-explanatory drawings, there are described and illustrated preferred and typical embodiments of the present invention but it is to be appreciated that the present invention is not to be construed as limited to such preferred and typical embodiments as are specifically disclosed and illustrated therein but to include other similar and equivalent embodiments, as are determined by the scope and the spirit of the appended claims.

Referring to the accompanying self-explanatory drawings.

These Figures have not been drawn precisely or accurately to scale. Some portions and some dimensions therein have been drawn to a slightly larger scale, whereas certain other portions and dimensions therein have been drawn to a slightly smaller scale. This has been done merely to bring out more clearly some of the details of the smaller portions and to accentuate some of the more important features and aspects of the present invention, such as the thickness of the printing ink composition layer which has been drawn increased manyfold in in the Figures.

GENERAL DESCRIPTION OF THE INVENTION

FIGS. 1-3

Figure 1:
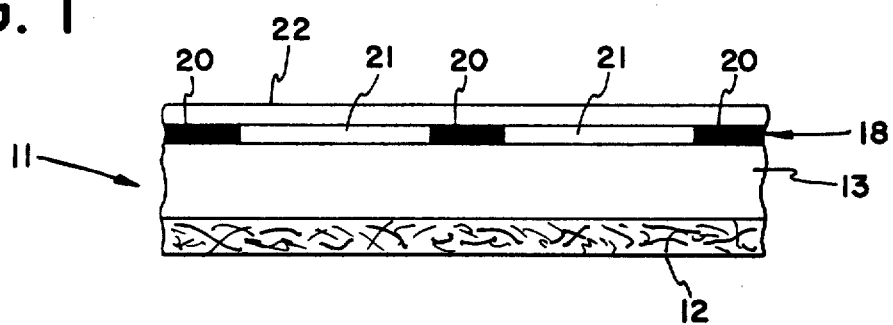
FIG. 1 is a fragmentary, diagrammatic, elevational, cross-sectional view of one embodiment of the present invention, showing the resinous polymer composition in its initial form, prior to heating and blowing.
Figure 2:
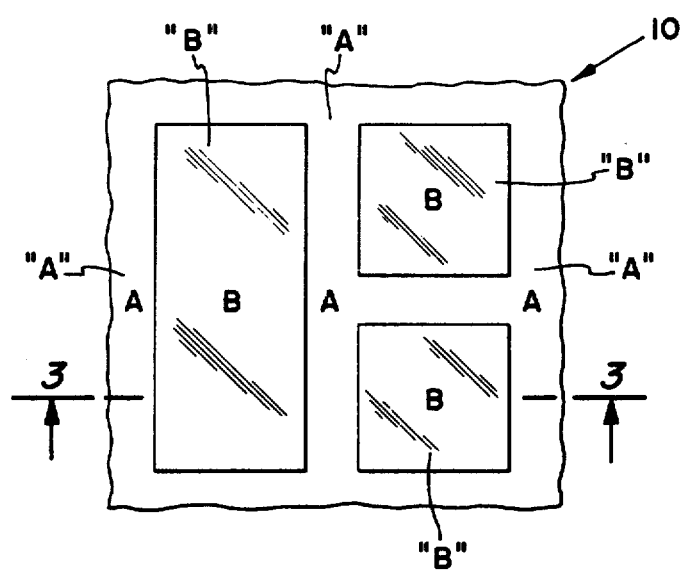
FIG. 2 is a fragmentary, diagrammatic, plan view of the resinous polymer composition of FIG. 1, but shown in its final form, after heating and blowing.
Figure 3:
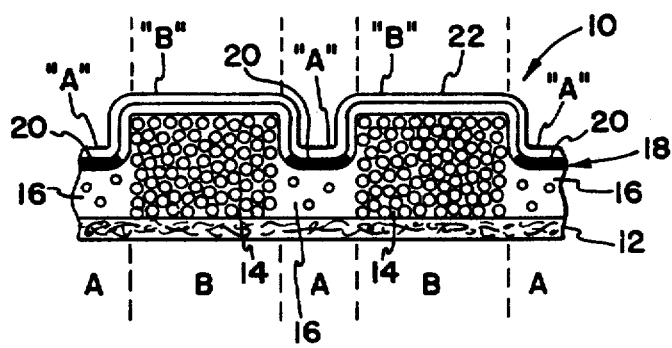
FIG. 3 is a fragmentary, diagrammatic, elevational, cross-sectional view of the embodiment of FIG. 1, also shown in its final form after heating and blowing, the cross-section being taken on the line 3—3 of FIG. 2.

The present invention will be generally described and illustrated primarily with reference to FIGS. 1-3 which are illustrative but not limitative of the scope of the broader aspects of the inventive concept. In these Figures, there is illustrated a resinous polymer sheet material 10 comprising a base layer or substrate 11 of a relatively flat sheet backing material 12 and a potentially foamable polymer composition 13 which, after mechanical embossing at an elevated temperature and under pressure and after subsequent blowing and foaming at an even more elevated temperature, possesses a relatively high, blown or foamed, uninhibited cellular resinous polymer composition 14 and a relatively low, relatively unblown or unfoamed, inhibited, relatively or substantially non-cellular resinous polymer composition 16. The term "substantially non-cellular" does not mean completely non-cellular but does indicate that the cells therein, if any, are very much smaller in size and very much fewer in number than the cells in the so-called cellular portions 14. A printing ink composition 18, in the form of a desired pattern or design usually containing many different colors, is applied to the surface of the potentially foamable resinous polymer composition 13, prior to the mechanical embossing at the elevated temperature and pressure and the subsequent blowing and foaming at the even more elevated temperature.

The pattern or design of the printing ink composition 18 possesses certain predetermined areas or colors 20 which, in this embodiment, contain a blowing modifier, such as an inhibitor, and a free-radical polymerization initiator or catalyst, such as an organic peroxide. However, other predetermined areas or colors 21 do not contain any blowing modifier or any free-radical polymerization initiator or any catalyst, for purposes to become clearer from a further reading and an understanding of this specification. A resinous polymer composition in the form of a wear layer 22 is applied substantially uniformly over the printing ink composition 18.

As noted especially in FIG. 3, the blowing modifier or inhibitor restricts the blowing or foaming of the potentially foamable resinous polymer composition 13 in the areas A which correspond to and are in perfect registry with the areas 20. At the same time, blowing or foaming and expansion of the potentially foamable resinous polymer composition 13 is not restricted or deterred in the areas B which do not lie directly over the areas 20 containing the blowing modifier or inhibitor. Thus far, all this is conventional and generally standard.

It is also to be noted that the free-radical polymerization initiator or catalyst which is also present in areas 20 causes, for reasons which will be explained in greater detail hereinafter, the surface areas of the wear layer 22 lying directly over the areas 20 to have an embossed flat, dead or dull mat finish or texture, whereas the other areas B of the wear layer 22 not lying directly over the areas 20 and which do not contain any of the free-radical polymerization initiator or catalyst have a sleek, glossy or lustrous finish. The two types of finishes are in sharp contrast to each other.

It is also to be realized that the areas 20 not only contain the free-radical polymerization initiator or catalyst, but also contain the blow modifier or inhibitor, as well as a predetermined pigment or color of the printing ink composition 18, in accordance with the multicolor pattern or design. As a result, the embossed, flat, dead or dull finish or texture in areas A are in complete and perfect registry with the relatively low, unblown or unfoamed portions 16 of the resinous polymer composition 13, as well as the predetermined pigment or color of the pattern or design. And, at the same time, the smooth, glossy or lustrous finish in areas B are in complete and perfect registry with the relatively high, blown or foamed portions 14 of the resinous polymer composition 13, as well as the other predetermined pigments or colors of the pattern or design.

More specific details of such constructions and their properties of perfect registration of embossing, and finishes or textures, and blown or foamed areas, and their respective colorations, as well as the methods and procedures for obtaining such constructions will be described in greater detail hereinafter with reference to the following preferred and typical embodiments of the present invention.

DESCRIPTION OF PREFERRED AND TYPICAL EMBODIMENTS OF THE INVENTION

THE BASE LAYER OR SUBSTRATE

The base layer or substrate 11 may comprise a relatively flat, fibrous backing sheet material 12 and/or a blown or unblown resinous polymer composition having a chemically embossed or unembossed surface and/or other relatively flat sheet materials.

THE BACKING SHEET MATERIAL

A relatively flat, backing web or sheet material 12 may be used, if desired or required, as the base layer or substrate 11 for the resinous polymer sheet materials 10 of the present inventive concept. Such a backing sheet material 12 may comprise a felted or matted fibrous sheet of overlapping, intermingled fibers and/or filaments; or a nonwoven, knitted, woven, or otherwise textile fabricated construction; or a sheet of resinous polymer composition; or paper or a paper product or similar or like equivalent constructions and materials. A felted fibrous sheet material comprising inorganic fibers, such as asbestos; or organic fibers, such as cellulose, cotton, jute, or rayon; or synthetic or man-made fibers and/or filaments, such as polyolefins, polyamides, acrylics, glass, etc., is the most commonly employed backing sheet material but many others are equally suitable and are utilizable in special situations. Such backing sheet materials are set forth in many prior art patents, such as U.S. Pat. Nos. 3,293,094, 3,293,108, and 3,660,187.

The thickness of such a relatively flat backing sheet material 12 will depend to a large extent upon the particular product to be made and the particular subsequent use for which it is intended. Normally, such thicknesses are in the range of from about 10 mils to about 90 mils, but other thicknesses, expecially those greater than 90 mils, may be used in special and particular circumstances.

THE POTENTIALLY FOAMABLE OR NONFOAMABLE RESINOUS POLYMER COMPOSITION

The relatively flat backing sheet material 12 may be used by itself as the base layer or substrate, or it may be used in conjunction with other sheet materials, such as, for example, a layer of potentially foamable or nonfoamable resinous polymer composition. Or the relatively flat, backing sheet material 12 may be omitted completely and the foamable or nonfoamable resinous polymer composition may be used by itself. Such resinous polymer compositions may be made by wellknown standard and conventional methods and may contain one or more synthetic resins, such as a polymer or copolymer of vinyl chloride, or other resins, such as polyurethanes, as the main constituent resin.

Other constituents of such resinous polymer compositions include: a blowing of foaming agent, such as azonicarbonamide, if a blowing or foaming agent is desired; various accelerator/stabilizers or catalysts such as dibasic lead phthalate, zinc octoate, zinc oxide, lead octoate, dibasic lead phosphite, etc.; various light and/or heat stabilizers, and metallic soaps; plasticizers as dioctyl phthalate, butyl benzyl phthalate, dibutyl sebacate, etc.; coloring agents and pigments as titanium dioxide; solvents and diluents as methyl ethyl ketone, mineral spirits etc.; fillers as clay and limestone; and many other conventional and well-known additives and improvement agents.

Although a polymer or copolymer of vinyl chloride in the form of a plastisol is the preferred and typical synthetic resin to be incorporated into the resinous polymer composition, many other resins are as equally applicable, not only in plastisol form but also in organosol, latex, or solvent form. The specific resin and its particular form of use as they are utilized herein, do not relate to the essence of the inventive concept and many other suitable resins are set forth in the United States Patents previously mentioned hereinbefore.

THE BLOWING OR FOAMING AGENT

Also, although azonicarbonamide is indicated herein and particularly in the Examples as the preferred and typical blowing or foaming agent to be included in the resinous polymer plastisol composition, when blowing or foaming is desired or required, many other similar or like equivalent blowing or foaming agents are also applicable within the principle of the present invention. The specific blowing or foaming agent which is used does not relate to the essence of the present invention and many other suitable and acceptable blowing or foaming agents are to be noted in the previously mentioned United States Patents. All that is required is that the blowing or foaming agent has a sufficiently high decomposition temperature that it is not activated or decomposed prematurely during the earlier procedures of heating, gelling, and the mechanical embossing to be described hereinafter.

Specific blowing or foaming agents and their decomposition temperatures at which they release gas vigorously include: azodicarbonamide (390° F.) N,N'-dimethyl-N,N'-dinitrosoterephthalamide (220° F.); azobisisobutyronitrile (240° F.); p,p'-oxybis (benzenesulfonylhydrazide) (320° F.) dinitrosopentamethylenetetramine (80%) (370° F.); p,p'-oxybis (benzenesulfonylsemicarbazide) (425° F.); barium azodicarboxylate (above 480° F.) and many others. Such decomposition temperature values relate to the release of gas vigorously in dioctyl phthalate.

OTHER CONSTITUENTS OF THE RESINOUS POLYMER COMPOSITION

In a similar way, many other accelerators, initiators, catalysts, viscosity improvers, light and heat stabilizers, uv absorbers, dyes, pigments, plasticizers, antioxidants, fillers, bacteriostats and bacteriocides, and many other additives may be included in the resinous polymer composition. The specific nature and the particular physical and chemical properties and characteristics of the various constituents of the resinous polymer composition do not relate to the essence of the present inventive concept and further specific elaboration of such additives is believed unnecessary and not required. All of these constituents are well known and conventional in the industry and many are set forth in the previously mentioned United States Patents.

The resinous polymer composition is also preferably a dispersion of a synthetic resin in a liquid medium. The dispersion medium can be a plasticizer in the case of a plastisol, or water in the case of an aqueous latex, or it can be an organic solvent in the case of an organosol. Excellent results are obtained with a dispersion of a synthetic resin in a plasticizer as a plastisol and such form is the preferred and typical form for the application of the present invention.

A few preferred and typical plasticizers useful in forming such plastisols are dibutyl sebacate, dioctyl sebacate, dioctyl adipate, didecyladipate, dioctyl azelate, dibutyl phthalate, dicapryl phthalate, dioctyl phthalate, dibutoxy ethyl phthalate, tricresyl phosphate, octyl dephenyl phosphate, dipropylene glycol dibenzoate, butyl benzyl sebacate, dibenzyl sebacate, dibenzyl phthalate, butyl benzyl phthalate.

It is to be appreciated that, although plastisols will be used to further describe the present invention, such is not intended to exclude the use of organosols or aqueous latices which are also utilizable.

THE POTENTIALLY FOAMABLE PLASTICOL COMPOSITION

A few preferred and typical potentially foamable plastisol compositions are as follows:

| | P-6 | P-7 | P-8 | P-5 | P-9 | P-2 | P-10 | P-11 | P-12 | P-13 | P-14 | P-1 | P-3 | P-15 | P-4 | P-16 |
|---|---|---|---|---|---|---|---|---|---|---|---|---|---|---|---|---|
| Polyvinyl chloride, dispersion grade, inh. viscosity 1.0 | 50 | | 100 | | 25 | 75 | | | 50 | 50 | 70 | | | | | a |
| Polyvinyl chloride, dispersion grade, inh. viscosity 0.9 | 50 | 100 | 100 | 50 | | 75 | 100 | 75 | 50 | 50 | | 75 | 100 | 75 | 75 | b |
| Polyvinyl chloride, blending resin, inh. viscosity 0.9 | | | | 25 | 25 | 25 | | 25 | | | 30 | 25 | | 25 | 25 | c |
| Alkyl benzyl phthalate | | | | | | | | | | | 16.8 | | | | | d |
| Polydodecyl benzene | | | | | 12 | | | 12 | 12 | 12 | 13.3 | 12 | | 12 | 13.5 | e |
| Alkyl aryl modified phthalate ester | 55 | | | | | | | | | | | | | | | f |

|   | P-6 | P-7 | P-8 | P-5 | P-9 | P-2 | P-10 | P-11 | P-12 | P-13 | P-14 | P-1 | P-3 | P-15 | P-4 | P-16 |   |
|---|---|---|---|---|---|---|---|---|---|---|---|---|---|---|---|---|---|
| Alkyl aryl hydrocarbon | 10 |   | 5 |   |   |   |   |   |   |   |   |   |   |   |   |   | g |
| Di(2-ethyl hexyl phthalate |   |   | 60 | 57 |   | 7.09 |   |   | 8.02 | 4.2 | 3.27 | 2.91 | 2.52 | 62.5 | 2.53 | 6.36 | h |
| Butyl benzyl phthalate |   | 57 |   |   | 57 | 38 | 58 | 53 | 38 | 38 | 38 | 27.7 | 38 |   | 38 | 31.5 | i |
| Epoxidized esterified tallate |   |   |   |   |   |   |   |   | 5 |   | 5 |   |   |   |   | 5.1 | j |
| Mineral spirits (boiling point range 300° F.–425° F. |   |   |   |   |   |   | 1.55 | 1.55 | 1.55 | 1.55 | 1.55 |   | 1.55 | 1.55 | 1.55 | 1.55 | k |
| Diphenyl decyl phosphite |   |   |   |   |   |   |   |   |   |   |   |   |   |   |   |   | l |
| Dibasic lead phosphite | 1.5 | 1.11 | 1.0 | 1.11 | 1.11 | 1.11 |   | 3 |   | 1.0 |   |   |   |   |   |   | m |
| Zinc oxide |   |   |   |   |   |   |   | 0.83 |   |   |   |   | 0.86 |   |   |   | n |
| Zinc octoate (18% Zn) |   |   |   |   |   |   |   |   |   |   |   | 1.0 |   | 0.95 | 0.95 |   | o |
| Lead octoate (24% Pb) |   |   |   |   |   | 1.2 |   |   | 1.11 |   |   |   |   |   | 1.0 | 1.0 | p |
| Titanium dioxide | 5 | 5.29 | 2 | 5.29 | 5.29 | 5.29 | 5.29 | 5.29 | 5.29 | 5.29 | 5.29 | 3.64 | 5.29 | 5.29 | 5.29 | 5.29 | q |
| Azodicarbonamide | 2.5 | 2.53 | 3 | 2.53 | 2.53 | 2.53 | 2.53 | 2.53 | 2.53 | 2.5 | 2.53 | 2.32 | 2.53 | 2.53 | 2.53 | 2.53 | r |
| Anhydrous alumina silicate |   |   |   |   |   |   |   |   |   |   |   | 12.3 |   |   |   |   | s |

(Parts by weight, based on 100 parts of resin, phr)

The letters which have been positioned at the right hand side of each portion of the preceding table are used merely to facilitate the reading and the understanding of each portion of the table. They have no other significance.

All the plastisol compositions set forth in the preceding table are foamable resinous polymer compositions, inasmuch as azodicarbonamide is included in all the formulations. Such a blowing agent would be excluded if a non-foamable resinous polymer composition was desired or required.

If no backing sheet material such as a felted or matted fibrous web is to be used, then the plastisol may be doctored by a doctor blade, or roll coated, or poured, or cast, or otherwise applied to a strippable carrier which may be a steel belt, a rubber belt, release paper, or a felt or other fabric or material having a release coating thereon and subsequently stripped therefrom.

However, if a backing sheet material is to be used and is to remain as a part of the final product, then the plastisol may be doctored by a doctor blade, or roll coated, or poured, or cast, or otherwise applied and adhered to the carrying sheet material in a substantially uniform manner in a relatively uniform thin coating by procedures well-known in the art. The thickness of such a plastisol coating as a foamable resinous polymer composition, as applied and still wet, is in the range of from about 5 mils to about 50 mils, or even more, if so desired or required.

After the plastisol has been applied to the carrying backing sheet material, it is then heated under relatively gentle or moderate heat in an oven or other suitable heating device for a period of time of from about 1 minute to about 4 minutes at an elevated temperature of from about 240° F., to about 470° F., but more normal commercially from about 290° F., to about 350° F., whereby the plastisol firms and gels so that it can be more easily handled and processed subsequently. The temperature and time relationships are mutually interdependent and the higher the temperature, the shorter is the required time, and vice versa. The elevated temperature, however, is not sufficiently high as to activate or to decompose the particular blowing or foaming agent which may be present as to cause blowing or foaming of the resinous polymer composition.

THE PRINTING OF THE GELLED RESINOUS POLYMER COMPOSITION

The gelled, firm resinous polymer composition is then cooled and is printed or coated with a suitable printing ink composition in the desired or required pattern or design which may possess many colors. The particular pattern or design which is used does not relate to the essence of the invention and any suitable pattern or design may be selected.

The printing procedure is conventional and should require no further description, inasmuch as such procedures are well known in the industry and are described in many prior art patents.

If it is desired that different levels of heights of the blowing or foaming effects be obtained, then, predetermined parts or portions of the pattern or design printed on the surface of the resinous polymer composition contain a blow modifier or inhibitor in different amounts, concentrations, or types, and so forth, depending upon the variety of differential blowing or foaming effects desired. Such differential effects are well-described in the previously mentioned United States Patents and should need no further explanation or description.

Naturally, if no differential effects are desired as a result of the blowing or foaming procedure, then, no blow modifying agents or inhibitors are included in the printing ink composition and the levels and the extent of the blowing or foaming action is generally uniform. Some typical and well known conventional printing ink compositions are noted in the previously mentioned United States Patents.

THE FREE-RADICAL POLYMERIZATION INITIATOR OR CATALYST

Additionally, there is included in certain predetermined parts or portions of the selected printed pattern or design a polymerization initiator or catalyst for a purpose to be described hereinafter more fully, with reference to certain reactive polymerizable monomers also to be described more fully hereinafter.

The concentration of the free-radical polymerization initiator or catalyst in the prining ink composition will vary and will range from about 1 percent by weight to about 35 or 40 percent by weight, and preferably from about 1 to about 10 percent by weight, based on the total weight of the printing ink composition.

These free-radical polymerization initiators or catalysts, as they are often referred to in the industry, are perhaps more properly identified as organic peroxides, or per-compounds, which materials are largely chemically characterized by the presence in their structure of the thermally unstable oxygen-oxygen grouping (that is, —O—O—, a peroxy group). Such a group decomposes, normally upon being heated to certain elevated temperatures, to form free radicals to initiate the polymerization reaction. The specific free-radical polymerization initiator or catalyst which is selected for a particular polymerization or reaction depends upon the temperature at which the specific reaction or polymerization takes place, upon the rate of decomposition of the free-radical polymerization initiator or organic peroxide, upon the rate of generation or free radicals, upon the presence of metal ions or by the solvents of diluents in which the organic peroxides are often supplied commercially, upon the percent peroxide and the percent oxygen in the assay, upon the activation energy (k cal per mole), etc.

From a further reading and understanding of this disclosure, it will become apparent that dicumyl peroxide is the preferred and typical organic peroxide or free-radical polymerization initiator or catalyst, of use with the majority of polymerizable reactive monomers. Such preference is due basically to the fact that dicumyl peroxide fits in very desirably with respect to its one minute half-life temperature in relationship to the normal gelling temperature of the plastisol used, to the normal fusion temperature of the resinous polymer composition used, and to the normal decomposition temperature of the blowing or foaming agent used (azodicarbonamide). However, it is to be understood that many other organic peroxides or free-radical polymerization initiators or catalysts are suitable and satisfactory for applying the principles of the present inventive concept. For example, di-butyl tin dilaurate would be a preferred and typical cross-linking catalyst, if a different resinous polymer composition, such as a polyurethane, is used. Other preferred and typical organic peroxides and per-compounds include:

Di-t-butyl peroxide
2,5-dimethyl-2,5-bis(t-butylperoxy) hexane
2,5-dimethyl-2,5-bis(t-butylperoxy) hexyne-3
di-t-amyl peroxide
t-butyl-2-hydroxethyl peroxide
a,a'-bis(t-butylperoxy) diisopropyl benzene
benzoyl peroxide
diisobutyryl peroxide
2,4-dichlorobenzoyl peroxide
diisononanoyl peroxide
decanoyl peroxide
lauroyl peroxide
acetyl peroxide
succinic acid peroxide
bis-p-chlorobenzoyl peroxide
2,5-dihydroperoxy-2,5-dimethyl hexane
cumene hydroperoxide
t-butyl hydroperoxide
p-menthane hydroperoxide
diisopropylbenzene hydroperoxide
1,1,3,3-tetramethyl butyl hydroperoxide
di(n-propyl)peroxy dicarbonate
diisopropyl peroxydicarbonate
di(sec-butyl) peroxydicarbonate
di(2-ethylhexyl) peroxydicarbonate
dicyclohexyl peroxydicarbonate
dicetyl peroxydicarbonate
bis(4-t-butylcyclohexyl) peroxydicarbonate
t-butylperoxy isopropyl monocarbonate
2,2'-azobis(isobutyronitrile)
1,1-bis(t-butylperoxy)-3,3,5-trimethyl cyclohexane
t-butyl peroxyacetate
t-butyl peroxyisobutyrate
t-butyl peroxy-2-ethylhexanoate
t-butyl peroxypivalate
t-butyl peroxyneodecanoate
t-butyl peroxymaleic acid
di-t-butyl diperoxyphthalate
2,5-dimethyl-2,5-bis(benzoylperoxy) hexane
2,3-dimethyl-2,5-bis(octanoylperoxy) hexane
t-butyl peroctoate
t-butyl perbenzoate
acetyl cyclohexyl sulfonyl peroxide
acetyl sec-heptyl sulfonyl peroxide
2-t-butylazo-2-cyano-4-methoxy-4-methyl pentane
2-t-butylazo-2-cyano-4-methyl pentane
2-t-butylazo-2-cyanopropane
methyl ethyl ketone peroxide
2,4-pentanedione peroxide
cyclohexanone peroxide It is to be noted that compounds cover several classes of peroxides and encompass a very wide range, all of which, nevertheless, are utilizable under selected conditions, with particular reference to the plastisol gelling temperature, the plastisol and resinous polymer composition fusion temperatures, and the blowing and foaming temperatures, which, with respect to the preferred operating conditions of the present inventive concept, are normally commercially in the range of about 300° F., 350° F., and 395° F., respectively. For the specific purposes of the present invention, a preferred range of peroxides is noted as possessing one minute half-lives of from about 272° F. to about 376° F., with especially preferred commercial ranges of one minute half-lives of from about 305° to about 345° F.

The preferred ranges of the one minute half-lives of from about 272° F. to about 376° F., as will be discussed in greater detail hereinafter will most easily permit satisfactory and sufficient cross-linking of the reactive polymerizable monomer in the upper wear layer to occur after the plastisol gelling operation and primarily during the mechanical embossing operation, or perhaps even during the early part of the blowing and foaming operation. In this way, the mechanical embossment takes place after the gelling operation an is then retained throughout the blowing and foaming cycle in those areas where cross-linking of the polymerizable reactive monomer has taken place. If cross-linking of the reactive polymerizable monomer were to take place too early in the over-all procedure, such as before or during the initial plastisol gelling operation, then the desired mechanical embossment may become difficult or even impossible to obtain. In the same way, if cross-linking of the polymerizable reactive monomer were to take place too late, such as during the latter part of the blowing or foaming operation, then, perhaps, it may be too late for certain embossed areas of the wear layer to retain their mechanical embossment.

The concentration of the remaining constituents of the printing ink compositions which includes resins, pigments and dyes, solvents and diluents, blow modifiers and inhibitors, plasticizers, etc., are conventional and are within the ranges noted in the prior art, such as the previously mentioned United States Patents. With particular reference to the blow modifiers or inhibitors, it is to be stated that, although essentially all of the blow modifiers or inhibitors mentioned in these United States Patents are utilizable within the broader aspects of the present invention, three preferred and typical examples of such are trimellitic anhydride, fumaric acid, and benzotriazole.

A few preferred and typical printing ink compositions are as follows:

|   | | P-0 | P-00 | P-1 | P-2 | P-3 | P-4 | P-5 | P-6 | P-7 | P-8 | P-9 | P-10 | P-11 | P-12 | P-13 | P-14 | P-15 | P-16 | P-17 | P-18 | P-19 | P-20 |
|---|---|-----|------|-----|-----|-----|-----|-----|-----|-----|-----|-----|------|------|------|------|------|------|------|------|------|------|------|
| a | Vinyl chloride-vinyl acetate copolymer 90/10 | 6.6 37.4 | 6.8 38.2 | 9.5 53.5 | 10.1 57.4 | 9.7 54.7 | 10.4 58.6 | 12.5 70.5 | 12.5 70.5 | 7.1 40.1 | 9.5 53.5 | 8.8 49.7 | 6.8 38.2 | 10 56.6 | 10 56.6 | 8.2 46.7 | 10.3 58.1 | 10.5 59.7 | 9.9 55.8 | 10 56.6 | 9.5 53.5 | 9.5 53.5 | 9.5 53.5 |
| b | Methyl ethyl ketone | | | | | | | | | | | | | | | | | | | | | | |
| c | Titanium dioxide ink concentration, 55% | 25 | 25 | | 7.5 25 | 2.8 2.8 25 | 3.0 3.0 25 | 7.0 | 7.0 | 5.3 | 7.0 | 6.5 25 | 5.0 | 7.4 | 7.4 20 | 6.1 | 7.6 | 7.8 | 7.3 | 7.4 | 7.0 25 | 7.0 25 | 7.0 25 |
| d | Carbon black vinyl ink | | | 7.0 25 | | | | | | | | | | | | | | | | | | | |
| e | Trimellitic anhydride | 30 | 20 | | | | | | | | | | | | | | | | | | | | |
| f | Fumaric acid 62.5% in dioctyl phthalate | | | | | | | | | 40 | 20 | | 40 | 18 | | 32 | 19 | 16 | 20 | 18 | | | |
| g | Benzotriazole | 1.0 | 10 | 5.0 | | | | | | 7.5 | 10 | | | | | | | | | | | | |
| h | Dicumyl peroxide | | | | | 5.0 | | 10 | | | | | | | | | | 6.0 | 7.0 | | | | |
| i | t-butyl peroxybenzoate | | | | | | | | | | | | | | | | | | | | | | |
| j | t-butyl peroxyoctoate | | | | | | | | 10 | | | | | | | | | | | | | | |
| k | di-t-butyl peroxyphthalate | | | | | | | | | | | 10 | 10 | 8.0 | | | | | | | | | |
| l | 2,5-dimethyl-2,5-di(t-butyl-peroxy) hexane | | | | | | | | | | | | | | | | | | | 5.0 | | | |
| m | 1,1-bis(t-butyl peroxy)-3,3,5-trimethyl cyclohexane | | | | | | | | | | | | | | | | | | | 8.0 | | | |
| n | t-butyl peroxy isopropyl carbonate | | | | | | | | | | | | | | 6.0 | 7.0 | 5.0 | | | | | | |
| o | di-t-butyl peroxide | | | | | | | | | | | | | | | | | | | | 5.0 | | |
| p | Benzoyl peroxide | | | | | | | | | | | | | | | | | | | | | 5.0 | |
| q | t-butyl hydroperoxide | | | | | | | | | | | | | | | | | | | | | | 5.0 |

(Parts by weight) (or percent, if total of parts equals 100)

THE WEAR LAYER

The printed, gelled potentially foamable plastisol is then allowed to dry and a wear layer in the form of a resinous polymer composition or plastisol is then applied thereto. Such a wear layer composition contains conventional or standard constituents, such as resins (preferred and typical being polyvinyl chloride, medium to low molecular weight), plasticizers, stabilizers, pigments or dyes (on rare occasion), solvent and diluents, viscosity improvement and controlling agents, and like additives and materials. The concentrations of such constituents are conventional and standard and are in the ranges set forth in the previously cited United States Patents.

Additionally, however, there is also included in the wear layer composition a further ingredient comprising one or more reactive polymerizable monomeric materials, the polymerization and/or cross-linking of which can be initiated by the previously described polymerization initiators or organic peroxides. Such polymerization initiators are advantageously located in certain predetermined portions or colors of the pattern or design of the printing ink composition, whereby certain predetermined portions of the reactive polymerizable monomers lying directly thereover are polymerized and/or cross-linked, whereas certain other predetermined portions or colors of the pattern or design of the printing ink composition which do not contain any polymerization initiator therein do not polymerize and/or cross-link the reactive polymerizable monomers lying thereover.

The inherent viscosities of the polyvinyl chloride resins used in such wear layer compositions are in the range of from about 0.6 to about 1.2 but, depending upon conditions and circumstances, may be as high as about 1.6, as measured and determined by A.S.T.M. D-1243-66 prior to the initiation of the mechanical embossing procedure, which will be more fully described hereinafter

THE REACTIVE POLYMERIZABLE MONOMERS

The reactive polymerizable monomers are included substantially uniformly in the wear layer and are polyfunctional and contain at least two olefinically unsaturated sites in its molecule. Such monomers must be capable of polymerization at desired elevated temperatures usually higher than the plastisol gelling temperature but lower than the blowing agent decomposition temperature. Such polymerization takes place in all areas of the wear layer which are lying directly over the free-radical polymerization initiator or organic peroxide located in certain selected portions or colors of the printing ink composition.

Preferred and typical reactive polymerizable monomers include:

Diallyl fumarate
Diallyl maleate
Diallyl itaconate
Diallyl Phthalate
Ethylene glycol dimethacrylate
Ethylene glycol diacrylate
Diethylene glycol dimethacrylate
Diethylene glycol diacrylate
Triethylene glycol dimethacrylate
Triethylene glycol diacrylate
Tetraethylene glycol dimethacrylate
Tetraethylene glycol diacrylate
Polyethylene glycol dimethacrylate
Polyethylene glycol diacrylate
1.3-butylene glycol dimethacrylate
1.4-butylene glycol dimethacrylate
1.3-butylene glycol diacrylate
1.4-butylene glycol diacrylate
1.4-butanediol diacrylate
1.6-hexanediol dimethacrylate
1.6-hexanediol diacrylate
Allyl methacrylate
Allyl acrylate
Neopentyl glycol diacrylate
Neopentyl glycol dimethacrylate
Bisphenol A dimethacrylate (ethoxylated)
Divinyl benzene
Divinyl toluene
Trimethylolpropane trimethacrylate
Trimethylolpropane triacrylate
Pentaerythritol triacrylate
Glyceryl trimethacrylate
Triallyl cyanurate
Pentaerythritol tetraacrylate
Pentaerythritol tetramethacrylate
1,4-Butanediol Dimethacrylate It is to be noted that such monomers are polyfunctional and include difunctional, trifunctional and tetrafunctional monomers. However, if desired, a certain amount of monofunctional monomers may be included in the wear layer in admixture with the polyfunctional monomers. Such combinations often possess unique and very desirable characteristics and properties.

When monofunctional monomers are included with the polyfunctional monomers, they are present in amounts of from about 5% by weight to about 50% by weight, based on the total weight of all monomers in the resinous wear layer formulation. The total weight of all monomers in the wear layer is in the range of from about 5 parts by weight to about 40 parts by weight, based on 100 parts by weight of resin (phr) in the wear layer formulation, or preferably from about 15 parts by weight to about 35 parts by weight, based on 100 parts of resin (phr) in the resinous wear layer formulation.

The particular reactive polymerizable monomer or monomers which are selected for a particular use must, of course, be compatible with or dispersible in the resin representing the major constituent in the resinous wear layer formulation. It is usually contained in a copolymer, polymer or homopolymer of polyvinyl chloride. That is, the reactive polymerizable monomer must be miscible or dispersible in substantially all proportions with the main resin and must be capable of being easily and intimately dissolved or dispersed therein without separating into separate, distinct layers or portions, or occupying separate, discrete portions or phases in the resinous wear layer composition. And, of course, the reactive polymerizable monomer must also be relatively inert at low temperatures and non-reactive with respect to the other constituents of the resinous wear layer composition.

The thickness of such a resinous wear layer composition, as first applied to the printed pattern or design and still wet, is in the range of from about 2 mils to about 30 mils, or greater, if so required by special circumstances, requirements, or conditions.

Preferred and typical formulations for the wear layer are noted in the previously cited United States Patents, except that the reactive polymerizable monomer and monomers are not included therein.

After the wear layer containing the reactive polymerizable monomers has been applied and adhered to the vated or decompose to release their gases in a vigorous manner.

A few preferred and typical wear layer compositions are as follows:

| | W-1 | W-2 | W-3 | W-4 | W-5 | W-6 | W-7 | W-8 | W-13 | W-14 | W-9 | W-10 | W-12 | W-15 | W-11 | |
|---|---|---|---|---|---|---|---|---|---|---|---|---|---|---|---|---|
| Polyvinyl chloride, low molecular weight, dispersion grade, inherent viscosity 0.8 | 100 | 100 | 100 | 100 | 100 | 100 | 100 | 100 | 100 | 100 | 100 | 100 | 100 | 100 | 100 | a |
| Di(2-ethylhexyl) phthalate | | 5.0 | | 2.0 | | | | 4.0 | 8.0 | | | 5.0 | 1.0 | | | b |
| Tricresyl phosphate | | | | | | | | | | | | | | | | c |
| Epoxidized soya oil | 2.7 | 2.7 | 2.7 | 2.7 | 2.7 | 2.7 | 2.7 | 2.7 | 2.7 | 2.3 | 2.7 | 2.7 | 2.7 | 2.7 | 2.7 | d |
| Alkyl aryl modified phthalate ester | | | | | | | | | | 21.1 | | | | | | e |
| Epoxidized tall oil ester | | | | | | | | | 2.7 | | | | | | | f |
| 2,2,4-trimethyl-1,3-pentanediol diisobutyrate | 3.7 | 3.7 | 3.7 | 3.7 | 3.7 | 3.7 | 3.7 | 3.7 | 8.0 | 3.2 | 3.7 | 3.7 | 3.7 | 3.7 | 3.7 | g |
| Butyl benzyl phthalate | 15.5 | 15.5 | 15.5 | 15.5 | 15.5 | 15.5 | 15.5 | 15.5 | 8.0 | | 15.5 | 15.5 | 15.5 | 15.5 | 15.5 | h |
| Polydodecyl benzene | 4.6 | 4.6 | 4.6 | 4.6 | 4.6 | 4.6 | 4.6 | 4.6 | | | 4.6 | 4.6 | 4.6 | 4.6 | | i |
| Ba-Zn phosphite stabilizer | 6.6 | 6.6 | 6.6 | 6.6 | 6.6 | 6.6 | 6.6 | 6.6 | 6.6 | 6.6 | 6.6 | 6.6 | 6.6 | 6.6 | 6.6 | j |
| Nonyl phenyl polyethylene glycol ether | | | | | | | | | | 1.3 | | | | | | k |
| Ethyl-2-cyano-2,3-diphenyl acrylate | | | | | | | | | | 0.38 | | | | | | l |
| Violet toner | | | | | | | | | | 0.01 | | | | | | m |
| Pentaerythritol tetramethacrylate | | | | | | | | | | | | | | 25 | | n |
| Glyceryl trimethacrylate | | | | | | | | | | | | | 24 | | | o |
| Pentaerythritol triacrylate | | | | | | | | | | | | 20 | | | | p |
| Neopentyl glycol diacrylate | | | | | | | | | | | 25 | | | | | q |
| Trimethylolpropane trimethacrylate | 25 | | | | | | | 25 | | | | | | | | r |
| Polyethylene glycol dimethacrylate | | 20 | | | | | | | | 25 | | | | | | s |
| Tetraethylene glycol dimethacrylate | | | 27 | | | | | | | | | | | | | t |
| Ethylene glycol dimethacrylate | | | | 23 | | | | | | | | | | | | u |
| 1,3-butylene glycol dimethacrylate | | | | | 25 | | | | | | | | | | | v |
| 1,6-hexanediol dimethacrylate | | | | | | 28 | | | | | | | | | | w |
| Triethylene glycol dimethacrylate | | | | | | | 27 | | | | | | | | | x |
| Ethoxylated bisphenol A dimethacrylate | | | | | | | | 21 | | | | | | | | y |
| Diethylene glycol dimethacrylate | | | | | | | | | | | | | | | 28 | z |

(Parts by weight, based on 100 parts of resin, phr)

printed pattern or design of the printing ink composition, it is heated under moderately gentle heat in an oven or other suitable heating device for a period of time of from about 1 minute to about four minutes at an elevated temperature of from about 240° F. to about 470° F., whereby it hardens or firms and gels so that it can be easily handled in further operations. The temperature and time are so interrelated as to be interdependent and the higher the temperature, the shorter is the time of application of the heat, and vice versa. The elevated temperature, however, must not be that high as to activate or decompose the blowing or foaming agent which is normally present. Also, the temperature and the time must not be that great as to bring about a polymerization of the reactive polymerizable monomers in the wear layer.

As will become evident from a further reading and understanding of this disclosure, it is normally contemplated that the polymerization and cross-linking of the monomers in the wear layer take place during the embossing procedure which follows and which takes place under about the same temperature as the preceding gelling procedure but under additional pressure whereby the embossing of the surface of the wear layer and the polymerization of the reactive polymerizable monomers take place in the same operation.

As mentioned hereinbefore, such temperatures are, of course, below the temperature at which the blowing or foaming agent in the plastisol composition will be activated or decompose to release their gases in a vigorous manner.

THE MECHANICAL EMBOSSING PROCEDURE

In the following description of the mechanical embossing procedure. emphasis will be placed on the obtaining of a flat, dead or dull mat finish or texture which is roughened, corrugated, contoured, knurled, lined, or the like. Such may be obtained by means of proper pressure dies or similar tools, or by pressing the surface of the wear layer against a roughened or desirably corrugated or contoured surface, such as a fibrous paper surface, an uneven or roughened metallic surface, a fabric, or any coarse, grainy surface which is not smooth, sleek, glossy or lustrous.

The depth of the mechanical embossing may be as little as a fraction of a mil or it may be as much as about 15 mils, but preferably is from about 1 mil to about 4 mils, depending upon the type, thickness, and the nature of the wear layer being so embossed mechanically, upon the decorative effect which is desired or required, upon the type and the form of the mechanical embossing, and so forth.

At the conclusion of the mechanical embossing procedure, the entire surface of the wear layer is embossed so as to give it temporarily the desired flat, dead or dull mat finish or texture allover. Such a finish or texture is substantially completely lacking in brilliance, gloss, luster or sheen. The surface may be roughened, corrugated, coarse, lined or knurled in a regular or irregular, predetermined or random fashion and may possess numerous very small knobs, projections, ridges, points, or protuberances to give it the desired flat, dead or dull mat appearance. The mechanical embossing may also take the form of very many, very fine lines which are straight and parallel are swirling curves, as many as about 60 or 80 or even 100 or more lines per inch, or it may be the result of pressing paper, textured materials or fabrics, woven, knitted or nonwoven against the surface of the wear layer to create thereon the desired finish or texture.

The mechanical embossing to yield the desired flat, dead or dull mat finish or texture or other finishes may take place under pressures which may be as low as about 2 pounds per square inch gauge up to about 300 pounds per square inch gauge, depending upon the existing temperature which is in the range of from about 240° F., to about 470° F. If the pressure is applied in a press platen, the pressure may be maintained for a period of time of from about 10 seconds to as much as about 4 minutes. If the pressure is applied by means of a heated embossing roll, then the temperatures and the pressures will be in the higher portions of the aforementioned ranges, whereas the time of the application of the pressure will be correspondingly relatively short. However, the passing or the wrapping of the resinous polymer sheet material around a portion of the periphery of the heated embossing roll can be used to extend the duration of the application of heat. The pressure which are exerted, however, must be sufficient as to establish a good intimate contact between the heated embossing surface and the resinous polymeric materials being embossed.

The temperatures and the pressures which are realized during the embossing procedure are normally sufficient to activate or decompose the free-radical polymerization catalyst or organic peroxide in the predetermined portions of the printing ink composition which will bring about a polymerization or a cross-linking of the reactive polymerizable monomers lying over such predetermined portions. As a result, such portions of the wear layer possess an increased melt viscosity therein and a harder, more resistant surface which is capable of resisting any softening or melting tendencies during the subsequent heating involved in the blowing or foaming procedure. In this way, such portions are capable of retaining their flat, dead or dull mat embossed surface finishes or textures through the higher heating during the blowing and foaming operations.

On the other hand, however, those predetermined portions of the wear layer which lie over those portions of the printing ink composition which do not contain any free-radical polymerization initiator or organic peroxide are not materially polymerized or cross-linked, do not possess an increased melt viscosity and do not obtain a harder or more resistant surface and, consequently, when they are exposed to the greater heat of the blowing or foaming operation, they will not be able to resist any softening or melting tendencies, which are created and they will melt and soften and flow to fuse into a glossy, lustrous finish having a relatively high brilliance and sheen. Such a glossy, lustrous surface is very smooth and very planar and very reflective of any light incident thereon, as contrasted sharply to the flat, dead or dull mat finish which is not smooth or sleek and is not as reflective of any light incident thereon. The contrast created by these two types of finishes or textures is striking.

The final resulting product, in one form thereof, greatly resembles a ceramic tile flooring such as is commonly found in bathrooms, both as floor and as wall surfaces. The sleek, glossy or lustrous finish greatly resembles the surface of a glazed or fired ceramic tile, whereas the flat, dead or dull mat surface greatly resembles the grout or cementitious materials which are placed between the glazed ceramic tile. Such unusual and strongly contrasting finishes and textures are brought about during and as a result of the more elevated temperatures which prevail during the blowing and foaming operation.

THE BLOWING OR FOAMING OPERATION

The multi-layered assembly comprising: the backing sheet material and/or the potentially foamable (or non-foamable) plastisol; the printed pattern or design of the printing ink composition, portions or colors of which contain modifiers or inhibitors and free-radical polymerization initiators or organic peroxides, other portions or colors of which do not contain modifiers or inhibitors or free-radical polymerization initiators or organic peroxides; and the upper wear layer containing substantially uniformly therein the reactive polymerizable monomers, after being mechanically embossed over its entire surface, is heated to a sufficiently elevated temperature which is capable of fusing the resins in the resinous polymer compositions and which is also capable of activating or decomposing the blowing or foaming agents in the potentially foamable plastisols to cause vigorous blowing or foaming therein. Further, the surface of the wear layer is raised to the more highly elevated temperature whereby those areas thereof, which do not possess the higher melt viscosities or the polymerized or cross-linked monomers, soften, melt and flow to form the sleek, glossy and lustrous surfaces. And, naturally those other areas which possess the higher melt viscosities and the polymerized or cross-linked monomers resist the higher temperatures and do not soften, melt or flow but retain their flat, dead or dull mat surface finish or texture. The temperature of the entire assembly must reach the fusion temperature of the resins in order to obtain the desired maximum strength. Fusion is normally obtained at a temperature of from about 325° F. to about 470° F., depending upon the particular polymeric product being used. Such temperature also must be sufficient as to activate or decompose the particular blowing or foaming agent which is present in the plastisol. It is again to be observed that blowing and foaming temperatures, as well as fusion and gelling temperatures, are ambient air temperatures and not temperatures of the product exposed to such ambient air temperature.

Reference to the drawings, and particularly to FIGS. 2 and 3 thereof will clarify the actions which take place during such blowing and foaming procedures. The plastisol or the originally potentially foamable resinous polymer composition initially contained a blowing or a foaming agent therein, such as azodicarbonamide, which was substantially uniformly distributed therein. However, those portions of the printing ink composition 18 lying in zones A additionally contained a blowing or foaming modifier, such as an inhibitor, and hence those portions of the resinous polymer composition lying thereunder in zones A are relatively unblown or unfoamed due to the inhibiting action of the blowing or foaming inhibitor. On the other hand, those portions of the printing ink composition 18 lying in zones B did not contain any blowing or foaming modifier, such as an inhibitor, and hence such portions of the resinous polymer composition lying thereunder in zones B are relatively blown or foamed substantially completely. Such actions are well described in the previously mentioned United States Patents.

Additionally, those portions of the printing ink composition 18 in zones A also contained a free-radical polymerization initiator or organic peroxide which was activated or decomposed during the embossing operation to polymerize and/or cross-link the reactive polymerizable monomer in the wear layer 22 and to increase the melt viscosities of such portions. As a result, such portions retained their flat, dead or dull mat finish or texture throughout the blowing or foaming operation. On the other hand, however, those portions of the printing ink composition 18 in zones B did not contain any free-radical polymerization initiator or organic peroxide and there was no polymerization or cross-linking of the polymerizable monomer in the wear layer thereover and the melt viscosities of such portions did not increase. As a result, such portions were not able to resist the elevated temperatures of the blowing and foaming cycle, and they melted, softened and flowed to form sleek, glossy and lustrous surfaces in such zones B.

With further reference to the development of the sleek, glossy, or lustrous finish, as compared to the retention of the flat, dead or dull finish, the following numerical comparative gloss levels and ranges should exist for the satisfactory application of the principles of the present inventive concept.

The sleek, glossy or lustrous finish areas should have gloss levels in the range of from about 15 to about 90, or even higher; the flat, dead or dull mat finish areas should have gloss levels in the range of from about 70 down to about 3, or even less; with the differences in the gloss levels between the two contrasting finishes being in the range of at least about 10 in gloss level ranges below 50 and at least about 20 in gloss level ranges equal to or above 50. Such numerical gloss level values are determined by the procedures set forth in A.S.T.M. 523-67 (1972) at an angle of 60°.

It is also to be observed that reference to sleek, glossy or lustrous finishes, as compared to flat, dead or dull mat finishes, is merely a typical or preferred embodiment of the present inventive concept. These terms or phrases are comparative or relative terms or phrases and are used merely or primarily to indicate differences in gloss levels.

For example, the principles of the present inventive concept are equally applicable to the obtaining of a sleek, glossy or lustrous finish in some certain selected areas and the obtaining of even more sleek, glossy or lustrous finishes in certain other selected areas, again keeping the differences in the gloss level values greater than about 20, inasmuch as the gloss levels involved in such embodiment will be greater than about 50.

Such sleek and very sleek contrasts may be obtained by omitting the mechanical embossing procedure with a roughened surface and by substituting therefor a platen-pressing or press-rolling operation with a very smooth, highly polished surface, whereby the entire surface of the resinous wear layer is given an extremely smooth, sleek, shiny, glossy or lustrous finish.

High temperatures and pressures are subsequently similarly employed, as previously described in connection with the blowing and foaming step, whereby the polyfunctional reactive polymerizable and cross-linkable monomers in the wear layer lying over the polymerization and cross-linking initiators in the printing ink composition, having been cross-linked during the heated platen-pressing or press-rolling operation, effectively resist such heating and pressure and "freeze" those particular areas, whereby they are capable of retaining their extremely sleek, shiny, glossy or lustrous finish throughout such subsequent blowing or foaming operation.

However, those other areas which contain the monomeric materials not lying over any polymerization or cross-linking initiators or organic peroxides still contain such monomeric materials in unpolymerized and uncross-linked state and hence, soften, melt and flow and thus lose some of their extremely sleek, shiny, glossy or lustrous finish but do develop or retain sufficient of their previous extremely sleek, shiny, glossy or lustrous finish at least about 20 units in gloss level, less than the gloss level of the extremely sleek, shiny, glossy or lustrous finish.

Reference to FIGS. 1 through 3 of the drawings for comparative purposes only would therefore indicate that the use of the alternative procedures described in the preceding few paragraphs would have areas "B" as sleek, glossy or lustrous, whereas areas "A" would be even more sleek, glossy or lustrous.

THE BARRIER COAT

In some cases, it has been found that the blowing or foaming action of the potentially foamable plastisol is of such a strong and vigorous nature that the gases which are developed or liberated by the blowing or foaming agent tend to escape upwardly from the heated plastisol and tend to enter the wear layer to undesirably affect the smoothness and evenness of the wear layer surface and particularly those areas thereof having a low melt viscosity, or substantially no polymerized and/or cross-linked monomers therein, or sleek, glossy or lustrous surfaces. Such could be ruinous to the smoothness of such surfaces and would be undesirable from an esthetic viewpoint. Additionally, such affects the strong contrast between the sleek, glossy or lustrous surfaces and the embossed, flat, dead or dull surfaces adjacent thereto.

This undesirable effect can be avoided by placing a relatively thin barrier coat or layer having a thinness of only about 6 mils or less, down to about 1 or 2 mils, on top of the potentially foamable plastisol before the printed pattern or design is applied thereto, or alternatively such a barrier coat is applied over the printed pattern or design before the application of the wear layer. Such a barrier coat or film effectively prevents the gases from escaping upwardly from the blowing or foaming plastisol and entering the wear layer. The barrier layer is applicable as a film but is normally applied as a plastisol resinous polymer composition in a thin layer of a resin such as a vinyl chloride polymer or copolymer having a relatively very high molecular weight. Gelling of such a plastisol barrier layer naturally follows at an elevated temperature below the activation or decomposing temperature of the blowing or foaming agent and the polymerization initiator or organic peroxide.

The thickness of the barrier coat or layer must not be that great as to prevent the blow modifier or inhibitor from exerting its blow modifying or inhibiting effects downwardly through the barrier layer into the plastisol during the blowing operation or the polymerization initiator from exerting its effects upwardly during the polymerization and/or cross-linking of the reactive polymerizable monomers.

A few preferred and typical barrier coat formulations are as follows:

|  | BC-1 | BC-2 |
|---|---|---|
| Polyvinyl chloride, high molecular weight, dispersion grade, inherent viscosity 1.4 | 89 | 90 |
| Polyvinyl chloride, high molecular weight, blending resin, inherent viscosity 0.9 | 11 | 10 |
| Dioctyl phthalate |  | 6 |
| Epoxidized soya oil | 5 | 5 |
| 2,2,4-trimethyl-1,3-pentanediol diisobutyrate | 6.9 | 8.8 |
| Butyl benzyl phthalate | 29 | 19.6 |
| Polydodecyl benzene | 8.5 | 5.5 |
| Ba-Zn phosphite stabilizer | 7.25 | 3 |
| UV absorber | 0.32 | 0.32 |
| Toner | p.01 | 0.01 |

(Parts by weight, based on 100 parts by weight of resin, phr)

Other additives and agents, such as, for example, ethoxylated nonylphenol, a viscosity depressant, or other plasticizers and stabilizers solvents or diluents, fillers, etc., can be used.

THE MODIFICATION OF FIGS. 4 AND 4A

Figure 4:
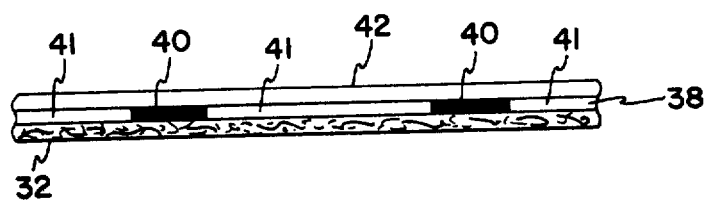
FIG. 4 is a fragmentary; diagrammatic, elevational, cross-sectional view of another embodiment of the present invention, showing the structure thereof, prior to heating and fusion.
Figure 4A:
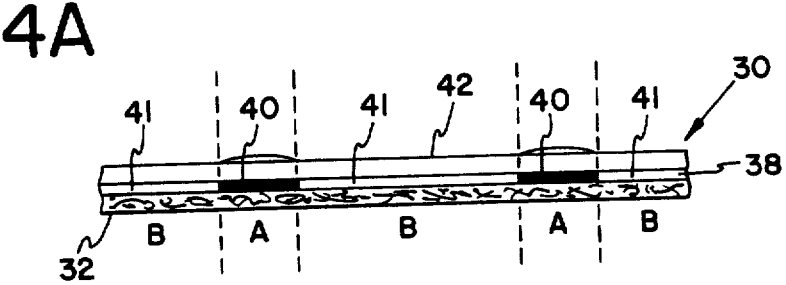
FIG. 4A is a fragmentary, diagrammatic, elevational, cross-sectional view of the embodiment of FIG. 4, showing the structure after heating and fusion.

It has been previously stated herein that the base layer or substrate 11 may comprise simply a fibrous backing sheet material and that other layers, such as non-foamable or potentially foamable resinous polymer compositions or plastisols or other sheet materials may be omitted. Such a modification is illustrated in FIGS. 4 and 4A which depict, respectively, the resinous polymer sheet material before and after the completion of the embossing and subsequent heating steps in its manufacture. In these Figures, there is shown a resinous polymer sheet material 30 comprising a relatively flat backing sheet material 32 of fibrous nature, such as an asbestos felt upon which is printed a printing ink composition 38 in the form of a desired pattern or design in a plurality of colors, as usual. If necessary, a smoothing or leveling resinous polymer coating, such as an acrylic coating, may be applied to the asbestos felt 32, if its surface is too uneven, hairy, fibrous, or irregular before the printing of the printing ink composition 38 thereon. No blow modifiers or inhibitors are included in any portion or color of the printed pattern or design. However, a free-radial polymerization initiator or organic peroxide is included in the portions 40 of the printed pattern or design, whereas no free-radical polymerization initiator or organic peroxide is included in the portion 41. A wear layer 42 is then applied to the surface of the printed pattern or design in the usual way and contains therein polymerizable reactive monomers substantially uniformly. The wear layer 42 is then embossed in overall fashion under sufficient pressure and at a sufficiently elevated temperature for a sufficiently long period of time as to create on its surface the desired finish or texture, such as a flat, dead or dull mat finish or texture.

During such mechanical embossing, the reactive polymerizable monomers in the wear layer 42 are polymerized and/or cross-linked and the melt viscosity is increased but only in those portions thereof which lie directly over the free-radical polymerization initiator or organic peroxide in the printing ink composition. All other areas which do not lie over any free-radical polymerization initiator or organic peroxide do not have any polymerized and/or cross-linked monomers in the wear layer and the melt viscosity of such areas is also substantially unchanged.

As a result, when the mechanically embossed sheet material is raised to an even more elevated temperature, somewhat similar to the temperature which would exist under blowing or foaming conditions, the polymerized and/or cross-linked portions of the wear layer which also have relatively higher melt viscosities, are able to resist the softening and the melting effects of such heating and retain their mechanical embossment and remain flat, dead or dull mat in appearance. However, the other areas which have not been polymerized and/or cross-linked and do not possess relatively higher melt viscosities, soften, melt and flow together to form a sleek, glossy and lustrous appearance.

The relatively flat, dead or dull mat finish or texture is designed in FIG. 4A by the reference letter A and it is to be noted that such areas are in complete and precise registry with the areas 40 containing the free-radical polymerization initiator or organic peroxide and with the particular color of the printed pattern or design containing such material. Also, the relatively sleek, glossy or lustrous surfaces are designated by the reference letter B and are over areas of the printing ink composition which do not contain any free-radical polymerization initiator or organic peroxide and thus is complete and precise registry with such areas which contain different colors of the printed pattern or design. Small proturberances are noted in the surface of the wear layer 42 in the zones A. These will be discussed in greater detail hereinafter.

THE MODIFICATION OF FIGS. 5 AND 5A

Figure 5:
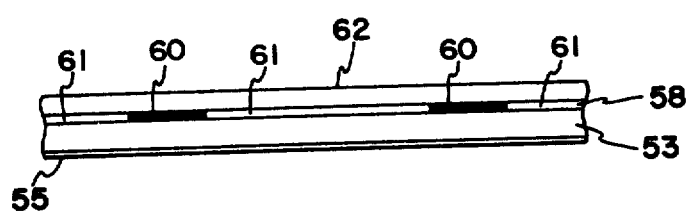
FIG. 5 is a fragmentary, diagrammatic, elevational, cross-sectional view of still another embodiment of the present invention, showing the structure thereof, prior to heating and blowing.
Figure 5A:
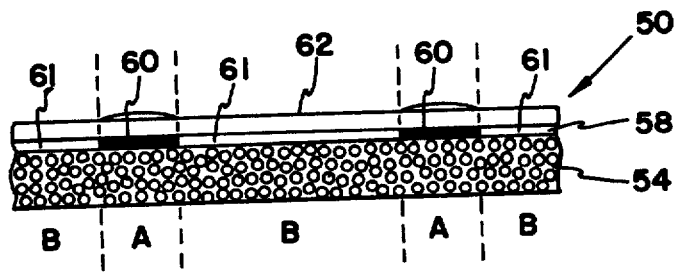
FIG. 5A is a fragmentary, diagrammatic, elevational, cross-sectional view of the embodiment of FIG. 5, showing the structure thereof, after heating and blowing and the subsequent removal of release paper.

It has also been stated herein that the base layer or the substrate 11 may comprise simply a resinous polymer composition and that other layers, such as a relatively flat, fibrous sheet material, or other sheet materials may be omitted. Such a modification is shown in FIGS. 5 and 5A which depict, respectively, the resinous polymer sheet materials before and after the completion of the mechanical embossing step and the blowing or foaming procedure. In these Figures, there is shown a resinous polymer sheet material 50 comprising a relatively flat and relatively thin sheet of release paper 55 of a conventional character as are commercially available. Upon such release paper 55 is deposited or laid down a layer of a potentially foamable resinous polymer composition 53 which contains a conventional blowing or foaming agent such as azodicarbonamide. The surface of the potentially foamable plastisol 53 is gelled and is then printed with a printing ink composition 58 which contains a free-radical polymerization initiator or organic peroxide and a particular pigment or color in areas 60, whereas other areas 61 do not contain any free-radical polymerization initiator or organic peroxide but do contain a different pigment or coloring agent. No blow modifiers or inhibitors are included in any portion of the printing ink composition 58.

A wear layer 62 is then applied to the surface of the printing ink composition 58 and contains substantially uniformly therein quantities of a reactive polymerizable monomer. The wear layer is then embossed mechanically under sufficient pressure and at a sufficiently elevated temperature and for a sufficiently long period of time as to create thereon the desired flat, dead or dull mat finish or texture in an overall pattern of embossment, during which time the reactive polymerizable monomer is normally polymerized and cross-linked.

A conventional blowing or foaming operation then follows at an even more elevated temperature whereby the blowing or foaming agent causes the expansion of the resinous polymer composition. Such expansion is well shown in FIG. 5A. At the same time, the highly polymerized or cross-linked monomers in the areas 60, which areas also possess higher melt viscosities, resist the softening or melting effects of the heat during the blowing and foaming operation and such areas 60 remain in a desired flat, dead or dull mat finish or texture. However, the areas 61 which do not lie over any portions of the printing ink composition 58 which contain any free-radical polymerization initiator or organic peroxide are not polymerized or cross-linked and do not have higher melt viscosities and are unable to resist the softening or melting tendencies created during the heating of the blowing and foaming cycle and hence such areas melt and flow together to form a sleek, glossy or lustrous surface which contrasts sharply with the flat, dead or dull mat finish or texture of the areas 60. Areas A are again flat, dead or dull, whereas areas B are sleek, glossy or lustrous.

Inasmuch as no blowing or foaming modifiers or inhibitors were present in the printing ink composition, the blowing or foaming is uniform and no chemically embossed effects are realized on the surface of the wear layer. Small protuberances are noted in the surface of the wear layer 62 in zones A. These will be discussed in greater detail hereinafter. The relatively flat and relatively thin sheet of release paper is removed from the bottom surface of the resinous polymer composition subsequent to the blowing or foaming cycle. However, if the resinous polymer composition, printing ink composition, and wear layer possess sufficient strength as to permit the handling thereof, or if another carrier is supplied therefor, then the release paper may be removed prior to the blowing and foaming operation.

Additionally, the resinous wear layer 62 may have incorporated substantially uniformly therein a polymerization initiator or organic peroxide which is activatable or decomposable at an even higher temperature than the decomposition or activation temperature of the polymerization initiator or organic peroxide in the printing ink composition 58.

Thus, after the polymerization and/or cross-linking of the reactive polymerizable monomer in zones A is substantially complete, then, the ambient air temperature may be increased to obtain the following results. Zones A which contain polymerized and/or cross-linked monomers and have higher melt viscosities retain their appearance and their protuberances. Zones B develop their sleek, glossy or lustrous appearance, as before. Thus far, only the polymerization initiator in zones A have been activated and/or decomposed. The polymerization initiator or organic peroxide in the wear layer has not been activated or decomposed as yet because it possesses a higher activation temperature. But, when the temperature is sufficiently elevated as to bring about blowing or foaming, then the polymerization initiator or organic peroxide in the wear layer is activated or decomposed, whereby all the reactive polymerizable monomer in the wear layer, including the zones B, are polymerized and/or cross-linked.

The result is that the surface of the wear layer 62 in zones A has an embossed, flat, dead or dull textured finish, whereas the surface of the wear layer 62 in zones B has a sleek, glossy or lustrous finish but both zones A and B contain high concentrations of polymerized and or cross-linked reactive polymerizable monomers and both portions have relatively high melt viscosities.

THE MODIFICATION OF FIGS. 6 AND 6A

Figure 6:
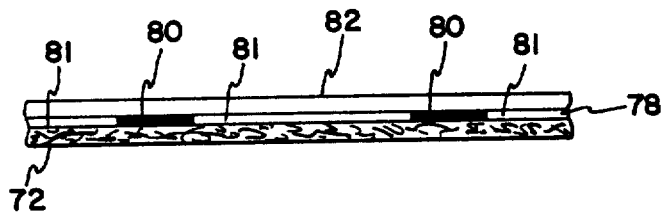
FIG. 6 is a fragmentary, diagrammatic, elevational, cross-sectional view of a further embodiment of the present invention showing the structure thereof, prior to heating and fusion.
Figure 6A:
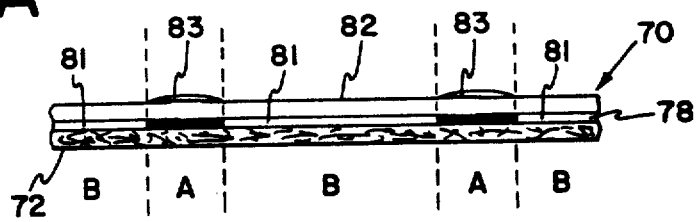
FIG. 6A is a fragmentary, diagrammatic, elevational, cross-sectional view of the embodiment of FIG. 6, showing the structure thereof, after heating and fusion.

In FIGS. 6 and 6A, there is illustrated still another modification of the principles of the present inventive concept. There is shown a conventional base layer or substrate comprising a relatively flat, fibrous backing sheet material 72 such as an asbestos felt, upon which is applied a printing ink composition 78 in the form of a desired multi-colored pattern or design wherein certain predetermined portions or colors 80 contain a free-radical polymerization initiator or organic peroxide and a particular pigment or coloring agent. Other predetermined printed portions 81 of the printing ink composition 78 on the surface of the fibrous backing sheet material 72 contain no free-radical polymerization initiator or organic peroxide but do contain a different pigment or coloring agent. Inasmuch as there is no potentially foamable plastisol involved, there is no need for a blowing or foaming modifier or inhibitor in the printing ink composition 78 or in any portion thereof.

An upper wear layer 82 comprising a resinous polymer composition is then applied to the surface of the printing ink composition 78 and contains substantially uniformly therein a reactive polymerizable monomeric material. The wear layer 82 is then heated to a relatively low temperature in order to gel and harden or firm its surface and to facilitate its subsequent handling and processing. No mechanical embossing of any type takes place on the surface of the wear layer 82, and in this respect it differs from the modification previously discussed with reference to FIGS. 4 and 4A.

Upon the application of sufficient heat to elevate the temperature of the resinous polymer material sufficiently to activate or decompose the free-radical polymerization initiator or organic peroxide, polymerization and cross-linking of the reactive polymerizable monomeric materials in the wear layer takes place, along with a corresponding increase in the melt viscosity of those areas 83 which are positioned directly over the free-radical polymerization initiator or organic peroxide in the printing ink composition 78. However, in the areas 81 which do not overlie any free-radical polymerization or cross-linking of the reactive polymerizable monomeric materials in the wear layer 82 and there is no concomitant increase in the melt viscosity in the areas 81.

Moreover, with respect to the areas 83 wherein there is polymerization and/or cross-linking along with increased melt viscosity, there is created an unusual and distinct embossed effect which causes the surface of the wear layer 82 to be raised or elevated to a higher level as much as about 5 mils or even more. Such raised or elevated effect not noted to any degree whatsoever in the areas 81 and the combined embossed effect of the raised portions in zones A as contrasted to the normal portions in zones B is esthetically excellent. Such raised or elevated protuberances which are also noted in other embodiments of the invention, may be as small as about 1 or 2 mils but are very noticeable. The precise reason for such an unusual effect is not fully or completely understood but it is believed to be caused by the differences in polymerization and/or cross-linking and melt viscosities in the two zones. In any event, even the smallest of the protuberances can be felt by the finger and observed by the naked eye.

THE MODIFICATION OF FIG. 7

Figure 7:
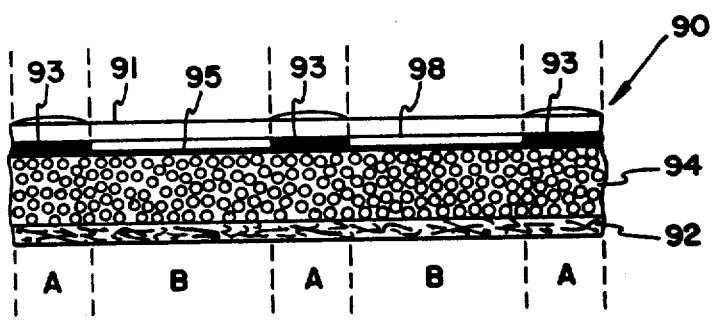
FIG. 7 is a fragmentary, diagrammatic, elevational, cross-sectional view of a still further embodiment of the present invention, showing the structure thereof, subsequent to heating and blowing.

In FIG. 7, there is illustrated a still further modification of the principles of the present inventive concept. There is shown a resinous polymer sheet material 90 comprising a conventional, relatively flat, fibrous sheet material 92 such as an asbestos felt. Applied to the fibrous backing sheet material 92 is a layer of a resinous polymer composition 94 which is shown in the blown condition due to the prior inclusion therein of a conventional blowing or foaming agent, such as azodicarbonamide, which was activated and decomposed by exposure to heat at a sufficiently elevated temperature for a sufficient period of time.

A barrier coat or layer 95 is situated atop the blown cellular resinous polymer composition 94 and serves to prevent any of the gases developed and liberated during the blowing and foaming operation from escaping. A printing ink composition 98 is applied to the surface of the barrier coat 95 in the form of a multi-colored pattern or design. Portions of the printed pattern or design contained a free-radical polymerization initiator or organic peroxide in areas 93, whereas certain other areas did not contain any free-radical polymerization initiator or organic peroxide.

No blow modifier or inhibitor is included in any portion of the printing ink composition 98 and hence the blowing or foaming is uniform and there is no chemical embossing of the top surface of a wear layer 91 which is applied to the top of the printing ink composition 98. The entire surface of the wear layer 91 was previously embossed mechanically but such embossment has disappeared from zones B and is evident only in zones A. Protuberances, as discussed previously hereinbefore, are again noted in zones A and can easily be felt by the finger and observed by the naked eye, especially when multi-colored patterns or designs are used.

Such difference in appearance, of course, is caused by the fact that the free-radical polymerization initiator or organic peroxide in zones A caused a polymerization and/or cross-linking of the reactive polymerizable monomeric material in the wear layer 91, along with an increase in the melt viscosity thereat, whereby the mechanical embossment in such zones survived the heating at the elevated temperatures of the blowing and foaming cycle. However, in zones B whereat there was no free-radical polymerization initiator or organic peroxide in the printing ink composition 98, there was correspondingly no polymerization and/or cross-linking of the reactive polymerizable monomeric materials in the wear layer 91, and there was no increase in the melt viscosity in such zones B. As a result, such areas were not able to resist the softening, melting and flowing tendencies created by the elevated temperatures during the blowing and foaming cycle. Such areas B are no longer embossed mechanically and they are no longer flat, dead or dull mat finished or textured but have become sleek, glossy and lustrous in appearance.

The net effect is somewhat similar to that achieved in the product of FIGS. 1–3, with the major exception that the resinous polymer composition in FIG. 7 did not have its blowing or foaming action modified or inhibited by the presence of any blow modifier or inhibitor in the printing ink composition but was allowed to blow and foam to expand evenly and uniformly. In FIGS. 1–3, the blow modifier or inhibitor brought about the embossed effect of the chemical embossing procedure.

THE MODIFICATION OF FIG. 8

Figure 8:
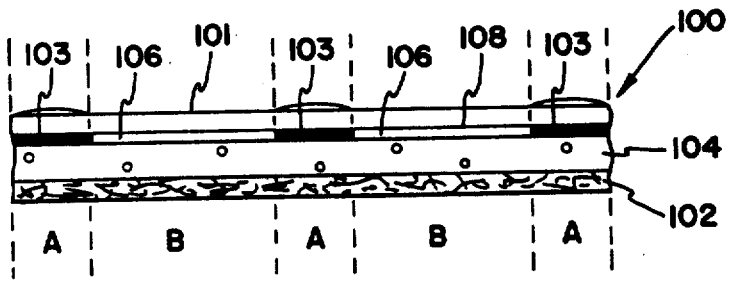
FIG. 8 is a fragmentary, diagrammatic, elevational, cross-sectional view of still another embodiment of the present invention, showing the structure thereof, subsequent to heating and fusion of the resins.

In FIG. 8, there is illustrated another modification of the basic principles of the present inventive concept. There is shown therein a resinous polymer sheet material 100 comprising a conventional, relatively flat, fibrous sheet material, such as an asbestos felt. Applied to the fibrous backing sheet material 102 is a layer of a resinous polymer composition 104 which is shown in an unblown or unfoamed state inasmuch as there was no blowing or foaming agent originally included in the plastisol composition. In the absence of blowing or foaming, the resinous polymer composition is noncellular in the final product.

No barrier coat is employed in such a modification and none is needed inasmuch as there is no gas development or liberation in the plastisol during the heated fusion operation at the elevated temperature. A printing ink composition 108 is applied to the surface of the resinous polymer composition 104 in the form of a multi-colored pattern or design. Portions of the printing ink composition 108 contain a free-radical polymerization initiator or organic peroxide, such as in areas 103, whereas other portions of the printing ink composition 108 do not contain any free-radical polymerization initiator or organic peroxide, as in areas 106.

Inasmuch as there is no blowing or foaming agent in the resinous polymer composition, the final height of the resinous polymer sheet material 100 is considerably less than that of FIG. 7 which, as noted previously, did contain a blowing or foaming agent, such as azodicarbonamide, in its resinous polymer composition 94. The mechanically embossed dead or dull, flat mat texture of the areas 103 (zones A) still are retained, whereas the areas 106 (zones B) have lost their flat, dead or dull mat texture and have become sleek, glossy and lustrous as a result of the heated fusion operation.

Such difference in appearance is caused by the fact that the free-radical polymerization initiator or organic peroxide in zones A caused a polymerization and/or cross-linking of the reactive polymerizable monomeric material in the wear layer 101, along with an increase in the melt viscosity thereat, whereby the mechanical embossment in such zones A survived the heating at the elevated temperatures of the fusion cycle. However, in zones B whereat there was no free-radical polymerization initiator or organic peroxide in the printing ink composition 108, there was correspondingly no polymerization and/or cross-linking of the reactive polymerizable monomeric materials in the wear layer 101, and there was no increase in the melt viscosity in such zones B. As a result, such areas 106 were not able to resist the softening, melting and flowing tendencies created by the elevated temperatures during the fusion of the resins. Such areas B are no longer mechanically embossed and they are no longer flat, dead or dull mat finished but have become sleek, glossy and lustrous.

The net effect is somewhat generally similar to that achieved in the product of FIG. 7, with the major exception that the product of FIG. 7 is blown and foamed, whereas the product of FIG. 8 is not blown or foamed. The surface of the wear layer, however, is very similar in both FIGS. 7 and 8, only the chemical embossment is different. Raised or elevated protuberances are again observed in zones A as before.

A FURTHER MODIFICATION

Thus far in this disclosure, the major emphasis has been placed on incorporating free-radical polymerization initiator and the blowing modifier or inhibitor in the same printed portion of the printed pattern or design of the printing ink composition, when both are to be used in the manufacture of the resinous polymer sheet material product. This is not always necessarily so. If desired, a free-radical polymerization initiator may be incorporated in one portion of the printed pattern or design and a blowing modifier or inhibitor may be incorporated in another portion of the print or design.

Preferred and typical printing ink compositions for such a modification are as follows:

|  | Parts |
| --- | --- |
| Solution grade copolymer of vinyl chloride (90 parts) and vinyl acetate (10 Parts) | 15 |
| Methyl ethyl ketone | 83 |
| Dicumyl peroxide polymerization initiator | 2 |
| Pigment or coloring material, as desired or required | |
| Solution grade copolymer of vinyl chloride (90 parts) and vinyl acetate (10 parts) | 14 |
| Methyl ethyl ketone | 66 |
| Trimellitic anhydride inhibitor | 20 |
| Pigment or coloring material, as desired or required | |

One preferred and typical final product ultimately is obtained and is structurally similar to the final product illustrated in FIGS. 2 and 3 of the drawings. Thus, if the trimellitic anhydride inhibitor is incorporated in zones A, the lower surfaces of the wear layer thereover as shown in FIGS. 2 and 3, do not retain the mechanically embossment impressed thereon and are sleek, glossy or lustrous. And, if the dicumyl peroxide polymerization initiator is incorporated in zones B, the higher surfaces of the wear layer thereover, as shown in FIGS. 2 and 3, retain the mechanical embossment impressed thereon and are flat, dead or dull. Thus, the final product is visually different from the final product which is obtained in FIGS. 2 and 3.

The structure of the product of this embodiment would be identical to the structure of the product illustrated in FIGS. 2 and 3, except for the reversal of the sleek, glossy or lustrous finish areas and the flat, dead or dull texture areas. Again, the portions of the wear layer lying over the polymerization initiator are relatively highly polymerized and cross-linked and have relatively high melt viscosities, whereas the portions of the wear layer lying over the blowing modifier or inhibitor are relatively low in polymerized or cross-linked monomer and have relatively low melt viscosities.

Such a reversal of surface visual effects is not desirable in simulated ceramic tile patterns or designs in most cases, wherein it is normally desired that the higher lands be sleek, glossy or lustrous and the lower mortar areas be flat, dead or dull, but is desirable in other patterns or designs wherein a greater diversification of visual effects is desired or required.

It is not essential that certain predetermined portions or colors of the printed pattern or design contain desired or required concentrations of the polymerization initiator or organic peroxide and that certain other predetermined portions or colors of the printed pattern or design contain absolutely no concentrations of the polymerization initiator or organic peroxide.

The polymerization initiator or organic peroxide may be contained in several different portions or colors of the printed pattern or design in several different concentrations. With the proper selection of desired varying concentrations several varying gradations of surface finishes or textures may be obtained. Sharpness of individual contrast may be lessened to some degree but a much greater variety of effects, finishes and textures is thus available.

Such variations and gradations of surface finishes and textures is also obtainable by the use of several different polymerization initiators or organic peroxides having several different levels or degrees of activity or several different temperatures of activation or decomposition. Polymerization initiators or organic peroxides which have greater activity tend to polymerize the reactive polymerizable monomers to a greater degree and to increase the melt viscosity of the corresponding portions of the wear layer to a greater extent, whereby greater resistance is created to the melting, softening and flowing effects during the blowing and foaming cycles. Thus, the placing of a high activity polymerization initiator or organic peroxide in one area of the printed pattern or design will tend to maintain the embossed flat dead or dull mat finish applied during the embossing procedure, whereas the placing of a low activity polymerization initiator or organic peroxide in a different area of the printed pattern or design will tend to permit the embossed flat dead or dull finish or texture to partially disappear to yield a different texture and/or gloss level or degree for the sleek, glossy or lustrous finish. Thus multiple mat and gloss and multiple finish and texture levels are obtainable.

In addition to the use of a plurality of polymerization initiators or organic peroxides in a plurality of different portions or colors of the printed pattern or design of the printing ink composition, an additional effect is obtainable by including an additional polymerization initiator or organic peroxide having a relatively high temperature of activation or decomposition in the wear layer in a substantially uniform manner.

Thus, it can be arranged that the several different polymerization initiators or organic peroxides may be activated or decomposed at several different stages of the procedure whereby several different finishes or textures may be obtained. Then, at a much later stage, such as, for example, during the blowing and foaming cycle, the high temperature polymerization initiator or organic peroxide may then be activated to polymerize and/or cross-link the reactive polymerizable monomers in the entire resinous wear layer. Such would tend to increase the melt viscosities of all the different areas of the resinous wear layer as an overall effect.

AN ALTERNATIVE PROCEDURE

An alternative "upside-down" procedure for making the resinous polymer sheet materials of the present invention is as follows: a resinous wear layer, such as described previously herein, is cast upon or otherwise formed on a suitably textured or embossed surface, such as a coarsely textured, parchment-type release paper, or other roughened, uneven, crinkled, rugose, or bumpy surface, or any similar or like protuberant or irregular surface having release properties and characteristics given to it.

The resinous wear layer composition is sufficiently fluid as to flow into and completely fill all the nooks and crannies, recesses and niches of the textured or embossed surface and thus to assume surface features and characteristics substantially identical thereto. Such a surface, being so irregular, uneven, pebbly or grainy that it does not reflect light regularly but more or less scatters it, would present a flat, dead or dull mat textured or embossed appearance to the eye, if the release surface were to be removed therefrom so that one could see the shaped surface of the resinous wear layer composition.

A printing ink composition, or a plurality of such compositions, such as described previously herein, is applied or otherwise deposited on the surface of the cast resinous wear layer composition, after it has been gelled by conventional and standard procedures. A desired design or pattern is thus applied, and, as described previously herein, certain predetermined areas of the printed pattern or design contain polymerization initiator or organic peroxide and, if desired, also a blowing or foaming modifier or inhibitor, whereas other predetermined areas of the printed pattern or design contain either (1) no polymerization initiator or organic peroxide at all, or (2) a different concentration of the same polymerization initiator or organic peroxide, or (3) a different polymerization initiator or organic peroxide having a different level or degree of activity or a different temperature of activation or decomposition. The printing ink composition is then dried.

A resinous barrier coat, such as described previously herein, may then be applied to or otherwise deposited on the dried printed pattern or design of the printing ink composition.

Heating the printing ink composition and polymerization initiator or organic peroxide contained therein and the resinous wear layer to a sufficiently elevated temperature then takes place, whereupon the polymerization and/or cross-linking of the reactive polymerizable monomer in the resinous wear layer takes place in selected predetermined portions thereof lying under the polymerization initiator or organic peroxide. No polymerization and/or cross-linking of the reactive polymerizable monomer, however, takes place in those portions of the resinous wear layer not lying under any polymerization initiator or organic peroxide. And, at the same time, the polymerized and/or cross-linked portions of the resinous wear layer develop increased higher melt viscosities. Additionally, gelling of the resinous plastisols takes place whereby further handling and further processing is made easier.

A base layer or substrate preferably comprising a relatively flat, fibrous backing sheet of asbestos fibers, such as described previously herein, and a potentially foamable resinous polymer composition, such as a polyvinyl chloride plastisol, also as described previously herein is then laminated or otherwise adhered to the surface of the barrier coat, preferably under pressure and at elevated temperatures in a laminator, to form a unitary, integral structure.

The strippable coarsely textured release surface upon which the resinous wear layer was originally cast or formed is then removed and reveals a suitable textured or embossed surface on the resinous wear layer, precisely corresponding to the textured or embossed surface of the release material.

Heating to an even more elevated temperature in a fusion or blowing or foaming oven atmosphere brings about several actions. Those portions of the resinous wear layer which do not contain any polymerized and/or cross-linked reactive polymerizable monomers and which do not possess relatively high melt viscosities soften and melt at such temperatures and flow to form a sleek, glossy or lustrous surface or finish, whereas those other portions of the resinous wear layer which do contain polymerized and/or cross-linked reactive polymerizable monomers and which possess relatively higher melt viscosities are able to resist the softening and melting tendencies at such elevated temperatures and do not flow but maintain their original textured or embossed flat, dead or dull surfaces.

At the same time, if a blowing or foaming agent, such as azodicarbonamide, was contained in the potentially foamable resinous polymer composition of the base layer or substrate, then blowing or foaming thereof takes place. And, if a blowing modifier or inhibitor was also included in the printed pattern or design of the printing ink composition, then the blowing or foaming action will be correspondingly modified or inhibited.

The final product is, of course, substantially similar to the final product obtained in the previously described methods but possesses the procedural advantage that no separate mechanical embossing step is required.

In this alternative "upside-down" procedure, it is noted that the resinous barrier coat is applied to the dried printed pattern or design of the printing ink composition, prior to the heating of the printing ink composition and the polymerization initiator therein and the resinous wear layer and the reactive polymerizable monomer therein to bring about the polymerization and/or cross-linking of the reactive polymerizable monomer. This is merely a preferred or typical method. The resinous barrier coat may be omitted completely or, if desired, it may be applied or otherwise adhered to the resinous wear layer prior to the application of the printed pattern or design. The important function to be realized is that the polymerization initiator in the printing ink composition be able to bring about the polymerization and/or cross-linking of the reactive polymerizable monomer and that the barrier coat is present, if needed, when the potentially foamable resinous polymer composition is subsequently blown or foamed and the generated gases are released.

A special note is deemed to be advisable with respect to the citation of temperatures and temperature ranges in this disclosure. Whenever material is being heated by being passed through a heated oven or other heating device, and the temperature of such a heated oven is maintained at a desired temperature, it is to be appreciated that the material does not reach that temperature, particularly if it is in such a heated environment for only a very short period of time. The temperature of the material is usually some degrees less than the temperature of the surrounding heated environment. Such a situation normally exists during a gelling operation of the plastisol when the plastisol is passed through a heated environment containing heated air.

On the other hand, whenever material is being pressed against a heated surface, such as a heated platen or other pressing device, and a very intimate contact is established between the heating element and the material to be heated, then the temperature of the material being heated will approach substantially the temperature of the heating source. Such a situation normally exists during a mechanical embossing operation wherein a heated platen or other embossed heated surface is pressed in very intimate contact with the material which is to be mechanically embossed. This is especially true if the heated platen or die is pressed against the surface of the material being heated and embossed under applied pressure, which in the present case may be in the range of up to 200 pounds per square inch gauge.

THE MODIFICATIONS OF FIGS. 9–12

Thus far, the emphasis of the present invention has been placed on the concept of providing certain surface portions of the wear layer with a flat, dead or dull mat finish, such as is created by the mechanical embossing, and certain other surface portions of the wear layer with another contrasting texture or effect, such as a sleek, glossy, or lustrous finish, such as is created in the heated fusion oven. In some cases, it may be desirable that substantially the entire surface portion of the wear layer retain the textured finish created by the mechanical embossing operation. Such overall effect may be achieved by several processes, such as illustrated in FIGS. 9–12 of the drawings.

Figure 9:
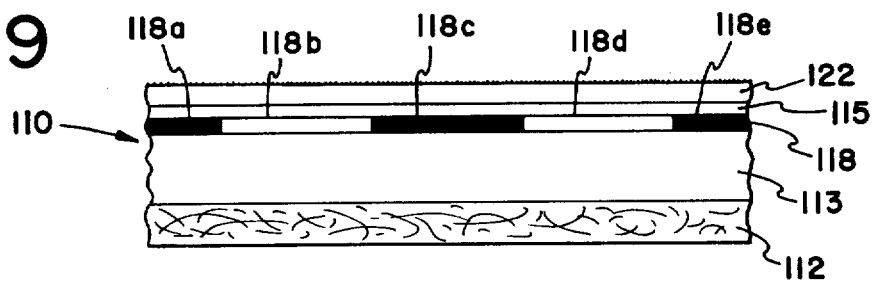
FIG. 9 is a fragmentary, diagrammatic, elevational, cross-sectional view of still another embodiment of the present invention, showing the structure of the product, either prior to heating and fusion of the resin, if a blowing or foaming agent was included in the resinous polymer composition, or subsequent to the heating and fusion of the resin, if no blowing or foaming agent was included in the resinous polymer composition.

In FIG. 9, there is illustrated a resinous polymer sheet material 110 comprising a typical, relatively flat, backing web or sheet material 112, similar to the backing sheet material 12 described previously. A relatively flat, substantially uniform layer of a potentially foamable (or non-foamable) resinous polymer composition 113, similar to previously described potentially foamable (or non-foamable) resinous polymer composition layer 13, is formed on or is applied to the backing sheet material 112.

Such resinous polymer composition 113 is then processed as described previously herein, including, for example, a heating, gelling and firming, and cooling operation, and is printed or coated with a suitable printing ink composition 118 having a desired pattern or design of various colors, such as 118a, 118b, 118c, 118d, and 118e.

Now, whereas in previous embodiments of the invention, some of these printed colored portions or areas contained certain amounts of polymerization initiators, catalysts, or organic peroxides, and other printed colored portions or areas contained different amounts or no polymerization initiators, catalysts, or organic peroxides at all, all of the colors, portions or areas of the printed pattern or design of FIG. 9 contain like amounts and equal concentrations of the same polymerization initiators, catalysts, or organic peroxides.

If desired, such as when a blowing or foaming operation is employed subsequently a relatively thin barrier coat or layer 115, such as the previously described barrier coat or layer, may be placed over the potentially foamable resinous polymer composition 113, either before the printed pattern or design 118 is applied thereto, or, as shown in FIG. 9, after the printed pattern or design is applied to the resinous polymer composition 113. The purpose of such a barrier coat or layer has been described previously herein.

A relatively uniform thin wear layer 122 containing one or more reactive polymerizable monomeric materials, such as the previously described wear layer 22, is then applied to the printed, gelled and cooled potentially foamable resinous polymer composition 113. Gelling and firming of the wear layer 122 take place, as described previously, followed by an over-all mechanical embossing procedure also as described previously.

Inasmuch as the entire surface of the wear layer 122 lies over some polymerization initiators, catalysts, or organic peroxides in the printing ink composition 118, polymerization and cross-linking of the reactive polymerizable monomeric materials takes place substantially uniformly throughout the wear layer 122, along with increased melt viscosities also being uniformly created throughout the wear layer 122 during the mechanical embossing.

Heating and fusion, as well as blowing or foaming (if a blowing or foaming agent was included originally in the resinous polymer composition 113), take place as described previously. The mechanical embossing of the surface of the wear layer 122 is retained substantially uniformly throughout, even after such operations.

Figure 10:
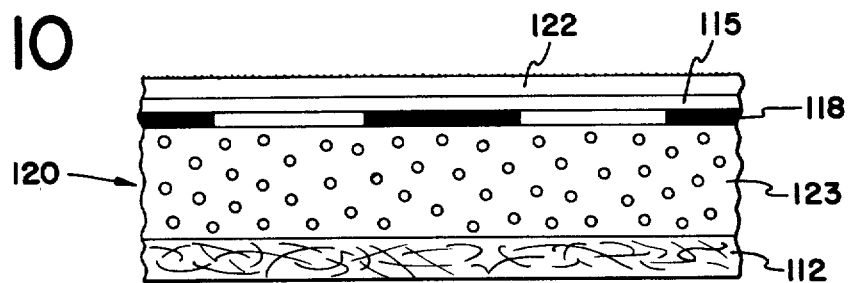
FIG. 10 is a fragmentary, diagrammatic, elevational, cross-sectional view of the embodiment of FIG. 9, subsequent to the heating and fusion of the resin, plus blowing or foaming, when a blowing or foaming agent was included in the resinous polymer composition.

FIG. 10 shows a relatively flat, resinous polymer sheet material 120 comprising: a fibrous backing layer 112; a printing ink composition 118 uniformly containing a polymerization initiator, catalyst, or organic peroxide; a barrier coat or layer 115; and a wear layer 122, all substantially as described previously with particular reference to FIG. 9. A resinous polymer composition 123 is employed which contains a blowing or foaming agent. The previously described procedures of heating, gelling and firming of the resinous polymer composition 123 and of the wear layer 122, along with the subsequent overall mechanical embossing of the surface of the gelled wear layer 122, and the other previously described procedures take place, followed by conventional heating and fusion, and blowing or foaming in a fusion oven. FIG. 10 illustrates the blown resinous polymer sheet material 123, subsequent to the heating, fusion and blowing or foaming operations. The mechanical embossing on the surface of the wear layer 122 is retained substantially uniformly throughout.

Figure 11:
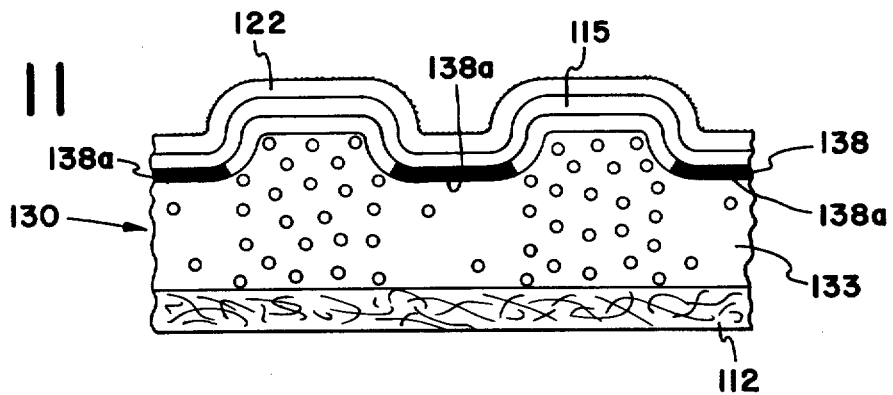
FIG. 11 is a fragmentary, diagrammatic, elevational, cross-sectional view of the embodiment of FIG. 10, subsequent to the heating and fusion of the resin, plus blowing or foaming, if a blowing or foaming inhibitor was included in certain portions or areas of the applied printing ink composition.

FIG. 11 shows a relatively flat, resinous polymer sheet material 130 comprising: a fibrous backing layer 112; a resinous polymer composition 133 containing a blowing or foaming agent; a printing ink composition 138 substantially uniformly containing equal concentrations and amounts of a free radical polymerization initiator, catalyst, or organic peroxide in all portions of areas thereof, as well as a blowing or foaming modifier or inhibitor which is contained only in certain selected portions or areas thereof 138a of the printing ink composition layer 138; a relatively thin barrier coat or layer 115; and a resinous polymer wear layer 122 which contains a reactive polymerizable monomeric material substantially uniformly therein.

A blowing or foaming agent has been uniformly included in the resinous polymer composition 133 and it is heated and fused and blown or foamed, as illustrated. However, due to the presence of the blowing or foaming modifier or inhibitor which is present in certain selected portions or areas 138a of the printing ink composition 138, the blowing or foaming operation proceeds selectively as is well known in the chemical embossing art, and the finished embossed product is illustrated in FIG. 11.

The intermediate operations of heating, gelling and firming of the resinous polymer composition 133, the printing of the printing ink composition layer 138, the application and the gelling, firming and cooling of the resinous polymer wear layer 122, and the heating, fusion, and blowing or foaming are standard and conventional and have been described previously herein and should require no further explanation or description. It is noted that the mechanical embossing on the surface of the wear layer 122 is retained substantially uniformly throughout.

Figure 12:
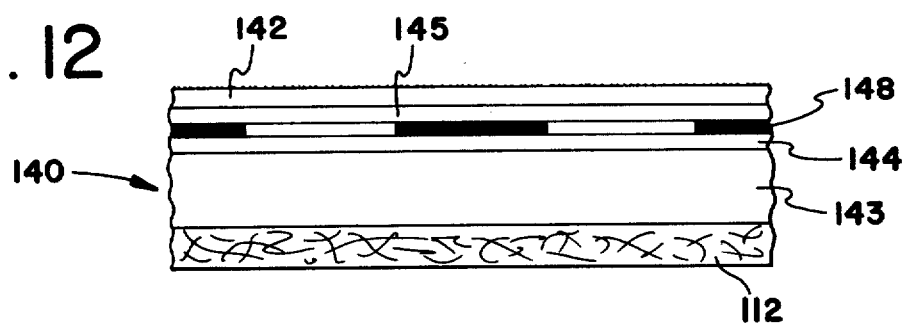
FIG. 12 is a fragmentary, diagrammatic, elevational, cross-sectional view of the still further embodiment of the present invention, wherein the free radical polymerization initiator, catalyst, or organic peroxide is contained in a separate layer of the product.

In FIG. 12, there is illustrated a resinous polymer sheet material 140 comprising: a typical, relatively flat, backing web or sheet material 112; a resinous polymer composition 143 which is potentially foamable or non-foamable, as desired or required; a substantially uniform resinous polymer coating such as a clear printing ink composition 144 which contains substantially uniformly therein from about 1% to about 35% or 40% by weight, and preferably from about 1% to about 10% by weight, of a polymerization initiator, catalyst, or organic peroxide; a printing ink composition 148 which does not contain any polymerization initiator, catalyst, or organic peroxide; a relatively thin barrier coat or layer 145, if a blowing or foaming agent is included in the resinous polymer composition layer 143; and a wear layer 142 containing substantially uniformly therein one or more reactive polymerizable monomeric materials.

The standard and conventional operations, such as those of heating, gelling and firming of the resinous polymer plastisol composition 143 and of the plastisol wear layer 142, as well as the mechanical embossing of the gelled and cooled surface of the wear layer 142, and the subsequent heating and fusion, and blowing or foaming of the resinous polymer composition 143 (if a blowing or foaming agent is included therein) follow in well-known fashion.

FIG. 12 illustrates the resinous polymer sheet material 140, either immediately prior to the heating and fusion, and blowing or foaming operation (if a blowing or foaming agent is present), or subsequent to the heating and fusion operations, if no blowing or foaming agent was present. The mechanical embossing on the entire surface of the wear layer 142 is retained substantially uniformly throughout these operations of heating, fusion, blowing or foaming.

If a blowing or foaming agent had been originally included in the resinous polymer composition 143 of FIG. 12, then such resinous polymer composition 143 would have become expanded and distended to generally resemble the blown or foamed resinous polymer composition 123 illustrated in FIG. 10.

In a similar way, if a blowing or foaming modifier or inhibitor had been originally included in certain selected, predetermined portions or areas of the printing ink composition 148 of FIG. 12, then such resinous polymer composition 148 (and all layers thereabove) would have become expanded and distended to generally resemble the blown and chemically embossed resinous polymer composition 133 of FIG. 11.

Still another embodiment of the present invention leading to the retention of the overall mechanical embossing on the surface of the wear layer through the heating and fusion, and blowing or foaming operations is describable without the need or the necessity for still another Figure in the drawings. Such embodiment excludes the presence of any polymerization initiator, catalyst, or organic peroxide from the printing ink composition, as in FIGS. 9-11, and also excludes the presence of any polymerization initiator, catalyst, or organic peroxide existing in a separate layer, as in FIG. 12.

In this non-illustrated embodiment, the polymerization initiator, catalyst, or organic peroxide is included directly and uniformly in the wear layer containing the reactive polymerizable monomeric materials, usually from about 0.5% by weight to about 5% by weight and preferably from about 1% to about 2% by weight based on the weight of the reactive polymerizable monomeric materials.

Alternatively, the polymerization initiator, catalyst, or organic peroxide may be included in the barrier coat 115 of FIG. 9 from about 0.08% to about 0.8% by weight and preferably from about 0.16% to about 0.32% by weight based on the total weight of the barrier coat composition.

Activation and polymerization and cross-linking of such reactive polymerizable monomeric materials takes place during the mechanical embossing procedure, as usual. Retention of such mechanical embossing effects is noted at the conclusion of the heating and fusion, and blowing or foaming operations.

The present invention will be described further with particular respect to the following specific examples, wherein there are shown preferred and typical embodiments of the present invention. However, it is to be appreciated that such specific examples are primarily illustrative of the general principles of the present invention and that the specific materials, chemicals, patterns, designs and other particular aspects should not be construed as limitative of the broader scope of the present inventive concept, except as defined by the scope and the spirit of the attached claims.

EXAMPLE I

A resinous polymer sheet material such as illustrated in FIGS. 1-3 of the drawings is made by the following procedures:

The base layer or substrate comprises a relatively flat, 0.040 inch thick fibrous sheet of felted asbestos fibers with an acrylic smooth leveling coating thereon. The asbestos felt fiber sheet is coated substantially uniformly to a wet thickness of about 0.015 inch with the following potentially foamable resinous polymer plastisol composition:

|  | Parts by Weight |
|---|---|
| Polyvinyl chloride, medium mol. wt., general purpose dispersion resin, inh. viscosity 0.99 (ASTMD1234-66) | 30.2 |
| Polyvinyl chloride, medium mol. wt., dispersion grade resin, inherent viscosity 1.0 | 8.2 |
| Polyvinyl chloride, medium mol. wt., blending resin, inherent viscosity 0.9 | 17.1 |
| Anhydrous alumina silicate filler | 6.9 |
| Butyl benzyl phthalate | 15.4 |
| Alkyl benzyl phthalate, low b.p. plasticizer | 9.3 |
| Polydodecyl benzene | 7.4 |
| Azodicarbonamide | 1.1 |
| Accelerator/stabilizer | 0.4 |
| Titanium dioxide | 2.5 |
| Dioctyl phthalate | 1.5 |
| Wetting agent | 0.0 |

Gelling and firming of the potentially foamable plastisol is accomplished in an oven at an elevated temperature of about 300° F., for about three minutes. The temperature is not sufficiently elevated as to activate or decompose the azodicarbonamide.

The gelled potentially foamable plastisol is then printed with a ceramic brick pattern or design as shown in FIGS. 2 and 3 of the drawings. Zones B are printed with a standard or conventional printing ink composition containing a predetermined pigment but which does not contain any blow modifier or inhibitor or any freeradical polymerization initiator or organic peroxide. Such a standard or conventional printing ink composition comprises:

|  | Parts |
|---|---|
| Solution grade copolymer of vinyl chloride (90 parts) and vinyl acetate (10 parts) | 15 |
| Methyl ethyl ketone | 85 |
| Pigment or coloring agent, as desired or required | |

Zones A, however, are printed with the following printing ink composition containing a different pigment or coloring agent:

|  | Parts |
|---|---|
| Solution grade copolymer of vinyl chloride (90 parts) and vinyl acetate (10 Parts) | 12 |
| Methyl ethyl ketone | 66 |
| Dicumyl peroxide | 2 |
| Trimellitic anhydride | 20 |
| Pigment or coloring agent, as desired or required | |

The printed, gelled potentially foamable plastisol is then allowed to dry and a wear layer is applied thereto to a wet thickness of about 0.015 inch and having the following formulation:

|  | Parts |
|---|---|
| Polyvinyl chloride, dispersion grade, inherent viscosity 0.8 | 100 |
| Trimethylolpropane trimethacrylate (90 ppm hydroquinone) | 25 |
| Butyl benzyl phthalate plasticizer | 13.8 |
| 2,4,4-trimethyl pentyl-3,5-diisobutyrate | 3.3 |
| Alkyl benzyl phthalate low boiling point plasticizer | 4.1 |
| Ba-Zn phosphite heat stabilizer | 6.4 |
| Epoxidized tall oil | 2.4 |

Gelling and firming of the wear layer plastisol is accomplished by heating in an oven atmosphere having an elevated temperature of just under 300° F., for a period of time of about 3 minutes.

The gelled wear layer is then mechanically embossed with a fine overall pattern of a parchment paper-like texture in a Watson-Stillman Press for about 2 minutes under a pressure of about 140 psig and at an elevated temperature created in the wear layer of just over 300° F. The heated embossing takes place, along with the polymerization and/or cross-linking of the trimethylolpropane trimethacrylate in the wear layer but only in those portions thereof lying directly over the dicumyl peroxide, whereas there is substantially no polymerization and/or cross-linking to any significant or substantial degree in those other areas of the wear layer not lying directly over the dicumyl peroxide. Additionally, the melt viscosity of the wear layer portions lying over the dicumyl peroxide is materially increased, whereas the melt viscosity of the wear layer portions not lying over the dicumyl peroxide is substantially unchanged.

The mechanically embossed material is then heated in a fusion oven maintained at an elevated temperature of about 395° F., for about 2¾ minutes. Fusion of the resins takes place, along with the blowing and foaming of the potentially foamable plastisol in those areas not lying directly under the trimellitic anhydride inhibitor in the printing ink composition. These is very little blowing or foaming in the areas lying directly under the trimellitic anhydride. The chemical embossing differential effect is excellent.

In addition, the elevated portions or lands of the wear layer, as seen in FIG. 3 of the drawings, develop a sleek, glossy or lustrous finish or texture, with high brilliance and sheen, whereas the lower or depressed portions or mortars retain the flat, dead or dull mat finish created therein by the mechanical embossing in the Watson-Stillman Press. The appearance of the material, after the blowing or foaming cycle is very much like that of a glossy, glazed ceramic tile of high sheen, surrounded by a flat, dead or dull mat finish giving the appearance of grout or other cementitious material between the ceramic tiles.

The different colors of the printed pattern or design of the printing ink composition are in complete and perfect registry with (1) the above-described mechanical embossing effects of the contrasting sleek, glossy or lustrous areas and the flat, dead or dull areas, as well as (2) the above-described chemical embossing effect of higher and lower areas on the surface of the wear layer.

Testing by means of solubility in tetrahydrofuran establishes that the trimethylolpropane trimethacrylate is not polymerized or cross-linked prior to the mechanical embossing; that it is polymerized and cross-linked during the mechanical embossing; and that it is still polymerized and cross-linked after the blowing and foaming cycle is complete but only in those areas of the wear layer lying directly over the dicumyl peroxide present in the printing ink composition, whereas all other areas of the wear layer not lying directly over the dicumyl peroxide, there is substantially no polymerization or cross-linking of the trimethylolpropane trimethacrylate.

With further reference to the melt viscosity determinations for the relatively highly polymerized and cross-linked portions and the relatively lowly polymerized and un-cross-linked portions of the resinous wear layer, it has been established that the following melt viscosity ranges are suitable for the application of the principles of the present inventive concept.

Using the conditions set forth in Example I for the Brabender determinations, the torque readings for the highly cross-linked portions of the wear layer should be in the range of from about 1000 to about 4000 meter-grams and the torque readings for the relatively un-cross-linked portions should be in the range of from about 300 to about 900, with differences in the torque readings for the two contrasting portions in the same product being at least about 250 meter grams.

It is to be appreciated that the references in the preceding paragraph and elsewhere in this disclosure to cross-linked polymeric materials refers solely to the polymerization and cross-linking of the poly-functional reactive polymerization monomeric materials, such as the trimethylolpropane trimethacrylate, for example, in the resinous wear layer, which, of course, is cross-linked and thermoset. It is also to be appreciated that the main resin in the wear layer, the polyvinyl chloride, for example, is substantially uniformly and homogeneously distributed therein and is in a fused and polymerized state. However, it is not cross-linked and is still in a thermoplastic state, as compared to the cross-linked and thermoset polyfunctional polymeric materials in those portions of the wear layer lying over the polymerization or cross-linking initiator or organic peroxide.

It is also to be observed that there is complete and perfect registry between: the flat, dead or dull textured portions of the wear layer; their corresponding colored portion of the pattern or design of the printing ink composition; and the relatively unblown or unfoamed portions of the resinous polymer composition 16. At the same time, there is complete and perfect registry between: the sleek, glossy or lustrous finish surfaces; their corresponding colored portions of the pattern or design of the printing ink composition; and the blown and foamed portions of the resinous polymer composition.

With respect to the determination of the melt viscosities of the various portions of the resinous wear layer, such is a relatively more complicated procedure. Resort to the C. W. Brabender Plastograph, or "Plasticorder", as described in Paint and Varnish Production, July, 1965, however, makes such determinations relatively simple and very accurate. Additional information on such procedures is also to be found on pages 23 through 32 of the Journal of Cellular Plastics, January/February, 1971.

Brabender determinations are run on samples of the highly polymerized portions of the resinous wear layer and on the relatively unpolymerized portions of the resinous wear layer at 150° C., at a shear rate of 30 revolutions per minute for fifteen minutes at which time the 53-gram samples are at equilibrium. A type 6 roller mixer measuring head is used to determine the melt rheology of the wear layer plastisols. The highly polymerized portions of the resinous wear layer yield torque readings of 2510 meter grams, whereas the relatively unpolymerized portions yield readings of only 650 meter grams.

EXAMPLE II

A resinous polymer sheet material such as is illustrated in FIG. 7 of the drawings is made as follows:

The procedures described in Example I are followed substantially as set forth therein with the exception that the trimellitic anhydride is omitted from the printing ink composition which comprises the following ingredients:

| | Parts |
|---|---|
| Solution grade copolymer of vinyl chloride (90 parts) and vinyl acetate (10 parts) | 15 |
| Methyl ethyl ketone | 83 |
| Dicumyl peroxide | 2 |
| Trimellitic anhydride | 0 |
| Pigment or coloring agent, as desired or required | |

The results obtained in this Example are generally comparable to the results obtained in Example I, with the exception that the resinous polymer sheet material of this Example is not chemically embossed and the blowing or foaming operation is substantially uniform in its effect whereby the surfaces of the wear layer are substantially level and of the same height. The flat, dead or dull embossed mat finish and the sleek, glossy or lustrous finish lie substantially in the same level plane. With respect to the concentration of polymerized or cross-linked trimethylolpropane trimethacrylate, it is relatively high in those areas lying over the dicumyl peroxide and relatively low in those areas not lying directly over the dicumyl peroxide. The melt viscosities are again relatively higher and lower, as indicated in Example I. Bumps as shown in the drawings are discernible and felt by the "finger-test". Barrier coat BC-1 is used in order to insure that no gases developed during the blowing or foaming escape up into the wear layer.

EXAMPLE III

A resinous polymer sheet material such as is illustrated in FIG. 8 of the drawings is made as follows:

The procedures described in Example II are followed substantially as set forth therein with the exception that, in addition to the omission of the trimellitic anhydride blow modifier or inhibitor from the printing ink composition, the azodicarbonamide blowing or foaming agent is omitted from the plastisol formulation. The results obtained in this Example are generally comparable to the results obtained in Example II, with the exception that the resinous polymer composition or plastisol is not chemically blown or foamed at all and the result is a more dense, non-cellular polymer sheet material in which the fused resins are heavier and are not too much unlike that portion of the fused resins illustrated in FIG. 3 of the drawings, lying under the portions of the printing ink composition containing the blow modifier or inhibitor. Such portions are identified in FIG. 1 by the reference letter A. In the product of FIG. 8, substantially all portions of the fused plastisol are similar.

Again, the flat, dead or dull mat texture of zones A is retained after the mechanical embossment and through the fusion heating at elevated temperatures. However, such texture in zones B is lost during the fusion heating at the elevated temperatures and the final appearance of such zones B is sleek, glossy and lustrous. Elevated or raised bumps shown in the drawings are detectible and felt by the "finger-rest". Inasmuch as no blowing or foaming is involved in this Example, no barrier coat is employed.

EXAMPLE IV

The procedures described in Example I are followed substantially as described therein, with the exception that the proportions of the constituents of the printing ink composition which contained both the free-radical polymerization or organic peroxide and the blow modifier or inhibitor are changed as follows:

| | Parts |
|---|---|
| Pigmented reducing clear (solution grade copolymer of 90 parts vinyl chloride and 10 parts vinyl acetate in methyl ethyl ketone, plus pigment) | 70 |
| Trimellitic anhydride chemical inhibitor | 20 |
| 40% dicumyl peroxide (active), supported on precipitated calcium carbonate | 10 |

The results of this Example are generally comparable to the results of Example I.

Again, it is determined that the polyfunctional reactive polymerizable monomeric material, namely, the trimethylolpropane trimethacrylate, is polymerized and is cross-linked solely in those areas of the wear layer lying directly over the polymerization initiator, namely, the dicumyl peroxide. In those other portions of the wear layer not lying directly over the dicumyl peroxide, the trimethylolpropane trimethacrylate is substantially unpolymerized and is not cross-linked.

EXAMPLE V

The procedures generally described in Example I are followed substantially as set forth therein with certain variations as follows: the P-1 potentially foamable plastisol composition is used; the wet thickness is about 18.7 mils; gelling takes place in a heated air atmosphere at about 300° F., for 3 minutes; a BC-1 barrier coat is used and has a thickness of about 3 mils; it is gelled in a heated air atmosphere at about 300° F., for about 3 minutes; the printing ink composition is P-1 and contains dicumyl peroxide and trimellitic anhydride as the polymerization initiator or organic peroxide and the blow modifier or inhibitor respectively; the non-active printing ink composition contains no polymerization initiator or organic peroxide or any equivalent material; the resinous wear layer is a W-1 composition and contains trimethylolpropane trimethacrylate as the reactive polymerizable monomer; it is about 12 mils thick and is gelled in a heated air atmosphere at about 300° F., for about 3 minutes; mechanical embossing takes place at about 305° F., under an applied pressure of 110 psig for 3 minutes against a coarsely textured parchment type release paper; blowing and foaming take place in a heated fusion oven at an elevated temperature of about 395° F., for about 2 minutes and forty seconds.

The results obtained in this Example are generally comparable to the results obtained in Example I. The relatively low, relatively unblown mortar areas have embossed, flat, dead or dull finishes to textures, whereas the relatively elevated, relatively blown land areas possess a sleek, glossy or lustrous surface. The mortar areas have a relatively high concentration of polymerized cross-linked monomer and have a high melt viscosity. The land areas have practically no concentrations of polymerized cross-linked monomer and have a relatively low melt viscosity. The product is commercially acceptable as a resilient floor covering.

EXAMPLES VI-XVI

The procedures set forth in Example V are followed substantially as described therein with the exception that the P-1 printing ink composition used therein is replaced by printing ink compositions P-7 through P-17, as described previously herein, as eleven additional Examples:

The results of these Examples are generally comparable to the results obtained in Example V. The relative differences between (1) the flat, dead or dull mat textured finishes and the sleek, glossy or lustrous areas and (2) the degree of polymerization and/or cross-linking of the reactive polymerizable monomer in these areas and (3) the degree of increase in the melt viscosity of the polymerized and cross-linked areas is significant and notable.

EXAMPLES XVII-XXI

The procedures described in Example V are followed substantially as described therein with the exception that the dicumyl peroxide polymerization initiator in the printing ink composition is replaced by:

| Example XVII | t-butyl peroxyacetate |
| Example XVIII | 2,5-dimethyl-2,5-bis(benzoylperoxy)hexane |
| Example XIX | t-butyl peroxyneodecanoate |
| Example XX | t-butyl peroxy maleic acid |
| Example XXI | 2,5-dimethyl-2,5-bis(2-ethylhexylperoxy)hexane |

The results of these Examples are generally comparable to the results obtained in Example V.

EXAMPLES XXII-XXV

The procedures set forth in Example V are followed substantially as described therein with the following exceptions, with respect to the printing ink compositions used therein, wherein printing ink compositions identified as P-2 through P-5 in the pertinent table are used:

Example XXII (P-2) contains trimellitic anhydride but no dicumyl peroxide or any other polymerization initiator or organic peroxide. This yields a product structurally shown in FIGS. 2 and 3 of the drawings but without any embossed, flat, dead or dull textured areas, and with no portions having increased melt viscosities.

Example XXIII (P-3) contains trimellitic anhydride and dicumyl peroxide. This yields a product generally comparable to the product obtained in Example V. It possesses embossed, flat, dead or dull textured areas and sleek, glossy or lustrous finish areas and differentials in melt viscosities. It is commercially acceptable as a resilient floor covering.

Example XXIV (P-4) contains trimellitic anhydride but no dicumyl peroxide or any other polymerization initiator or organic peroxide. This yields a product structurally shown in FIGS. 2 and 3 of the drawings but without any embossed, flat, dead or dull textured areas and with no portions having increased melt viscosities.

Example XXV (P-5) contains dicumyl peroxide but no trimellitic anhydride or any other blow modifier or inhibitor. This yields a product structurally similar to that shown in FIG. 7 of the drawings. There are embossed, flat, dead or dull textured areas, as well as sleek, glossy or lustrous finish areas, and differentials in melt viscosities, but there is no chemical embossment in the surface of the wear layer, other than the small elevated or raised bumps shown in FIG. 7.

EXAMPLES XXVI-XXXI

The procedures described in Example V are followed substantially as set forth therein with the exception that the wear layer composition W-1 used therein is replaced by wear layer compositions W-3, W-6, W-7, W-9, W-10 and W-12, as described in the pertinent table herein. The results of these Examples are generally comparable to the results obtained in Example V with wear layer composition W-1. The contrast between the embossed, flat, dead or dull textured areas and the sleek, glossy or lustrous smooth finish areas is very pronounced. The differences in polymerization and/or cross-linking of the reactive polymerizable monomers in the respective wear layers are marked and considerable. The differences in the melt viscosities of the various areas of the wear layer is also observed and is marked and considerable. The products are commercially acceptable as resilient floor coverings.

EXAMPLES XXXII-XXXVI

The procedures described in Example V are followed substantially as set forth therein with the exception that the trimethylolpropane trimethacrylate reactive polymerizable monomer is replaced by:

| Example XXXII | Triethylene glycoldiacrylate |
| Example XXXIII | Tetraethylene glycol diacrylate |
| Example XXXIV | 1,6-hexanediol diacrylate |
| Example XXXV | Neopentyl glycol dimethacrylate |
| Example XXXVI | Trimethylolpropane triacrylate |

The results of these Examples are generally comparable to the results obtained in Example V. The polymerization and/or cross-linking and the increase in melt viscosity are as described therein, along with the contrasting flat, dead or dull textures areas and the sleek, glossy or lustrous areas.

EXAMPLE XXXVII

The procedures set forth in Example I are followed substantially as described therein with the exception that the composition of the resinous wear layer is changed to the following:

|  | Parts |
|---|---|
| Polyvinyl chloride, dispersion grade, inherent viscosity 0.8 | 50 |
| Polyvinyl chloride, blending resin, inherent viscosity 0.71 | 50 |
| Trimethylolpropane trimethacrylate (90 ppm hydroquinone) | 25 |
| Butyl benzyl phthalate | 13.8 |
| 2,4,4-trimethyl pentyl-3,5-diisobutyrate | 3.3 |
| Alkyl benzyl phthalate | 4.1 |
| Ba-Zn phosphite heat stabilizer | 6.4 |
| Epoxidized tall oil | 2.4 |

(Parts by weight, based on 100 parts of resin, phr)

The results of this Example are generally comparable to the results obtained in Example I. The differences in polymerization and/or cross-linking of the reactive polymerizable monomer and the difference in melt viscosities of the various portions of the wear layer are noted, along with the contrasting surfaces of a flat, dead or dull mat texture and a sleek, smooth, glossy or lustrous finish. The product is commercially acceptable as a resilient floor covering. Similar to the product of Example I, the portion of the wear layer in the flat, dead or dull mat finish area is cross-linked and thermoset, whereas the portion of the wear layer in the sleek, smooth, glossy or lustrous finish areas is not cross-linked nor is it thermoset but is still thermoplastic.

EXAMPLE XXXVIII

The procedures described in Example V are followed substantially as described therein with the exception that the barrier coat composition BC-1 which is used therein is replaced by the barrier coat composition BC-2, as previously described hereinbefore. The results of this Example are generally comparable to the results obtained in Example V. The thickness of the barrier coat is also 4.5 mils.

EXAMPLES XXXIX–XLI

The procedures described in Example V are followed substantially as described therein with the exception that the thickness of the barrier coat is changed to 1.5 mils, 4 mils, and 5 mils, rather than the 4.5 mils thickness it possessed in Example V. The results of these Examples are generally comparable to the results obtained in Example V.

EXAMPLES XLII–XLIV

The procedures described in Example V are followed substantially as set forth therein with the exception that the mechanical embossing takes place under applied pressures of 50 psig, 86 psig and 100 psig, rather than the applied pressure of 110 psig as employed in Example V. The results of these Examples are generally comparable to the results obtained in Example V. The flat, dead or dull mat finish areas contain cross-linked and thermoset resin, whereas the sleek, smooth, glossy or lustrous finish areas contain un-cross-linked, thermoplastic resin.

EXAMPLE XLV

The procedures described in Example V are followed substantially as set forth therein with the exception that the conditions for the mechanical embossing of the resinous wear layer are changed to: 140 psig, at 360° F., for a period of time of about 15 seconds.

The results of this Example are generally comparable to the results obtained in Example V.

EXAMPLE XLVI

The procedures described in Example V are followed substantially as set forth therein with the exception that the conditions for the mechanical embossing of the resinous wear layer are changed to: 86 psig, 315° F., for a period of time of about 2 minutes.

The results of this Example are generally comparable to the results obtained in Example V.

EXAMPLE XLVII

The procedures described in Example I are followed substantially as described therein with the exception that the mechanical embossing is changed as follows:

Instead of applying pressure and heat to the coarsely textured, parchment-type release paper placed on the surface of the gelled resinous wear layer by means of a Watson-Stillman Press platen, the pressure and heat are applied by rolling contact with a 24-in. rotating embossing roll having a temperature of about 330° F., and rotating at a speed of 2 revolutions per minute. The surface of the embossing roll has a roughened, sand-blasted finish. The resinous wear layer is guided against the heated periphery of the embossing roll and is held in tight contact therewith for the major portion of the heated periphery, after passing through the pressure-applying roll-nip, thus creating about a 5-foot useful heated contacting periphery.

The results of this Example are generally comparable to the results obtained in Example I. The polymerized and cross-linked thermoset portions of the resinous wear layer which have the higher melt viscosity retain the surface features and characteristics of the coarsely-textured parchment-type release paper, whereas the un-cross-linked thermoplastic portions of the resinous wear layer become sleek, smooth and glossy and lustrous.

EXAMPLE XLVIII

The procedures described in Example XLVII are followed substantially as set forth therein with the exception that the heated, pressure-applying embossing roll is engraved with very fine parallel lines, fifty lines to the inch, which create the flat, dead or dull mat texture or finish, and contain cross-linked, thermoset resin, in contrast to the sleek, smooth, glossy or lustrous portions which contain un-cross-linked thermoplastic resin. The results of this Example are generally comparable to the results of Example XLVII.

EXAMPLE XLIX

The resinous polymer sheet material illustrated in FIGS. 2 and 3 generally is made by the following alternative "upside-down" procedure wherein the composition of the potentially foamable plastisol, the printing ink compositions, the barrier coat composition, and the wear layer composition are as described in Example V.

The resinous wear layer plastisol containing the reactive polymerizable monomer and while still in highly fluid form is cast upon the surface of a coarsely textured, parchment-type release paper to a depth of about 15 mils. The wear layer plastisol is sufficiently fluid as to flow into and completely fill all the irregular recesses of the release paper, thereby assuming the surface features and characteristics of the release paper. The wear layer is then gelled at 300° F.

The various printing ink compositions, some containing both dicumyl peroxide polymerization initiator and trimellitic anhydride blow modifier and others not containing any polymerization initiators or organic peroxides or any blow modifiers or inhibitors, are applied to various areas of the exposed face of the gelled wear layer in the desired pattern or design. The printing ink compositions are then dried.

A 3-mil barrier coat is applied and adhered to the printing ink compositions and is heated at a temperature of about 320° F., for a sufficient period of time to not only gel the resinous barrier coat but also to activate or decompose the dicumyl peroxide in the wear layer to polymerize and/or cross-link the reactive polymerizable monomers lying in the same vertical zones and to increase the melt viscosities of the resins in such vertical zones.

A base layer or substrate comprising a potentially foamable plastisol composition and an adhered fibrous sheet of felted asbestos fibers is then laminated to the gelled barrier coat by passage through a laminator device under pressure and at an elevated temperature. The resulting laminated product is unitary and integral in structure.

The coarsely textured parchment-type release paper is then stripped from the wear layer whose surface is thus exposed and found to be correspondingly coarsely textured and parchment-like in appearance, possessing a flat, dead or dull texture all over its surface.

This laminated product is then passed through a heated fusion oven at temperatures of about 395° F., and the resins are fused along with the blowing and the foaming operation wherein the blowing and foaming agent and the blowing modifier or inhibitor carry out their previously described chemical embossing procedures.

The resulting blown product is generally similar and comparable to the product of Example V. Those portions of the wear layer wherein the reactive polymerizable monomers are polymerized and/or cross-linked and also possess a higher melt viscosity retain their coarsely textured parchment-type, flat, dead or dull mat structure and appearance. In other portions of the wear layer wherein there was substantially no polymerization and/or cross-linking of the reactive polymerizable monomers and wherein the melt viscosity is still relatively unchanged and is relatively low, the surfaces are melted to form sleek, smooth, glossy or lustrous finishes, occurring during the blowing and the foaming operation. The cross-linked portions are thermoset, whereas the portions which are not cross-linked are thermoplastic.

EXAMPLE L

The procedures described in Example V are followed substantially as set forth therein with the exception that cumene hydroperoxide which is a polymerization initiator or organic peroxide activatable or decomposable only at relatively high temperatures is additionally included in the resinous wear layer substantially uniformly in a concentration of about 7 parts by weight based on 100 parts of resin, phr.

The cumene hydroperoxide is not activated or decomposed during the gelling operations or during the mechanical embossing operations, at which time the dicumyl peroxide is activated or decomposed in the printing ink composition whereby certain selected portions of the wear layer become polymerized and/or cross-linked, and develop relatively high melt viscosities, as described in this specification and in Example V in greater detail.

However, the cumene hydroperoxide is subsequently activated or decomposed at the more elevated temperatures which are present during the fusion, blowing or foaming cycle, whereby the reactive polymerizable monomers in the remaining sleek, smooth, glossy or lustrous finish areas are polymerized and/or cross-linked at that time, along with the increase in the melt viscosities in such sleek, smooth, glossy or lustrous portions. Apparently, the softening, melting and flowing in such areas precedes the polymerization and/or cross-linking and increase in melt viscosities in such areas.

There is no substantial change in the flat, dead or dull textured areas which are polymerized and/or cross-linked and have relatively high melt viscosities. Thus, the entire surface is polymerized and/or cross-linked and have relatively high viscosities.

EXAMPLE LI

Gloss level measurements are obtained for the wear layer surfaces (both land and mortar areas) of various polyvinyl chloride resinous sheet materials which are made by hand-operated, manually controlled laboratory procedures at 60°, using a Gardner Laboratories glossmeter standardized to an appropriate gloss plate for the 60° meter. Such laboratory procedures are not as sophisticated or as refined as are commercial plant manufacturing procedures and occasional blisters and irregularities cause lower than normal gloss readings. The various polyvinyl chloride resinous sheet materials are obtained by the procedures generally described in Example I, with any variations in such procedures being noted.

| Variations from Example 1 | Gloss Land | Measurements Mortar |
|---|---|---|
| No variations from Example I | 16 | 4 |
| Inhibitor is 25% trimellitic anhydride | 28 | 8 |
| Inhibitor is 25% trimellitic anhydride | 25 | 4 |
| Inhibitor is 25% trimellitic anhydride | 33 | 6 |
| Monomer is 28 phr 1,6-hexanediol dimethacrylate | 44 | 11 |
| Monomer is 28 phr 1,6-hexanediol dimethacrylate | 29 | 7 |
| Monomer is 20 phr pentaerythritol triacrylate | 20 | 7 |
| Monomer is 20 phr pentaerythritol triacrylate | 37 | 13 |
| Inhibitor is 20% Benzotriazole; dicumyl peroxide is increased to 10% | 15 | 4 |
| No peroxide included (Control) | 20 | 19 |
| No peroxide included (Control) | 22 | 18 |

EXAMPLE LII

Gloss level measurements are obtained for the wear layer surfaces (both land and mortar) of various polyvinyl chloride resinous sheet materials which are made by automated, electronically-controlled commercial production plant procedures, at 60° using a Gardner Laboratories glossmeter standardized to an appropriate gloss plate for the 60° meter. Such commercial production plant procedures are very sophisticated and very refined and yield gloss level measurements higher than those obtained by laboratory procedures. The various polyvinyl chloride resinous sheet materials are obtained by the procedures generally described in Example I, with any variations in such procedures being noted.

| Variations from Example I | Gloss Land | Measurements Mortar |
|---|---|---|
| No variations from Example I | 72 | 20 |
| Inhibitor is 25% trimellitic anhydride | 78 | 19 |
| Inhibitor is 25% trimellitic anhydride | 79 | 18 |
| Inhibitor is 25% trimellitic anhydride | 72 | 17 |
| Monomer is 28 phr 1,6-hexanediol dimethacrylate | 80 | 27 |
| Monomer is 28 phr 1,6-hexanediol dimethacrylate | 71 | 21 |
| Monomer is 20 phr pentaerythritol triacrylate | 67 | 16 |
| Monomer is 20 phr pentaerythritol triacrylate | 72 | 20 |
| Inhibitor is 20% Benzotriazole; dicumyl peroxide is increased to 10% | 63 | 14 |

EXAMPLE LIII

Hot melt viscosities for various polyvinyl chloride plastisols are obtained, employing the C. W. Brabender "Plasticorder" with a jacket temperature of 150° C.—to equilibrium in fifteen minutes; a shear rate of thirty revolutions per minute; and a sample weight of 53 grams.

In the following charts, the reactive polymerizable monomeric materials and the organic peroxide or free-radical polymerization initiator are as indicated. Monomer "A" is trimethylolpropane trimethacrylate; monomer "B" is 1,6-hexanediol dimethacrylate; and monomer "C" is pentaerythritol triacrylate. The organic peroxide or free-radical polymerization initiator is 40% active dicumyl peroxide, supported on precipitated calcium carbonate. The resin for the first two controls is 100 parts Firestone polyvinyl chloride resin 605. The resin for the second two controls is 89.5 parts of Geon polyvinyl chloride resin 120X271 and 10.5 parts of Tenneco 501. The resin for the second chart is 100 parts Firestone polyvinyl chloride resin 605. 53.3 parts per hundred resin plasticizer blend are used for the controls.

| Controls | Hot Melt Viscosity Meter-grams |
|---|---|
| No Monomer | 600 |
| No Monomer | 600 |
| No Monomer | 840 |
| No Monomer | 820 |

| Resin | Plasticizer Blend phr | Peroxide phr | Monomer "A" phr | Monomer "B" phr | Monomer "C" phr | Hot Melt Viscosity Meter Grams |
|---|---|---|---|---|---|---|
| 100 | 23.3 | 1.59 | 30 | | | 3180 |
| 100 | 23.3 | 1.59 | 30 | | | 3210 |
| 100 | 23.2 | 7.95 | 30 | | | 3210 |
| 100 | 23.2 | 7.95 | 30 | | | 3130 |
| 100 | 38.3 | 1.59 | 15 | | | 1510 |
| 100 | 38.3 | 1.59 | 15 | | | 1470 |
| 100 | 38.3 | 7.95 | 15 | | | 1250 |
| 100 | 38.3 | 7.95 | 15 | | | 1250 |
| 100 | 25.3 | 1.59 | | 28 | | 2160 |
| 100 | 25.3 | 1.59 | | 28 | | 2100 |
| 100 | 25.3 | 7.95 | | 28 | | 2070 |
| 100 | 25.3 | 7.95 | | 28 | | 2050 |
| 100 | 39.3 | 1.59 | | 14 | | 1120 |
| 100 | 39.3 | 1.59 | | 14 | | 1090 |
| 100 | 39.3 | 7.95 | | 14 | | 1150 |
| 100 | 39.3 | 7.95 | | 14 | | 1150 |
| 100 | 23.3 | 1.59 | | | 30 | 3430 |
| 100 | 23.3 | 1.59 | | | 30 | 3400 |
| 100 | 23.3 | 7.95 | | | 30 | 3210 |
| 100 | 23.3 | 7.95 | | | 30 | 3380 |
| 100 | 38.3 | 1.59 | | | 15 | 1460 |
| 100 | 38.3 | 1.59 | | | 15 | 1440 |
| 100 | 38.3 | 7.95 | | | 15 | 1470 |
| 100 | 38.3 | 7.95 | | | 15 | 1460 |

EXAMPLE LIV

The procedures set forth in Example I are followed substantially as described therein with the exceptions that a barrier coat or layer is used, as shown in FIG. 9, and all the various colored portions and areas of the printing ink composition used in applying the desired pattern or design to the gelled and cooled resinous polymer plastisol composition have the following formulations containing the same concentrations and amounts of dicumyl peroxide polymerization initiator or catalyst:

| | Parts |
|---|---|
| Solution grade copolymer of vinyl chloride (90 parts) and vinyl acetate (10 Parts) | 15 |
| Methyl ethyl ketone | 83 |
| Dicumyl peroxide | 2 |
| Pigments or colorants, as desired or required, in the particular pattern or design | |

The product, immediately prior to the heating and fusion, and blowing or foaming operation, is illustrated in FIG. 9.

Omisssion of the azodicarbonamide blowing or foaming agent (1.1 parts) from the formulation of the resinous polymer plastisol composition of Example I provides a final unblown or unfoamed product, such as illustrated in FIG. 9, wherein the mechanical embossing is substantially completely retained throughout the heating and fusion, and blowing or foaming operations. In such a case where there is no blowing or foaming, the barrier coat or layer is eliminated.

Inclusion of the azodicarbonamide blowing or foaming agent (1.1 parts) in the formulation of the resinous polymer plastisol composition of Example I provides for a blown final product, such as illustrated in FIG. 10, wherein the mechanical embossing is substantially completely retained throughout the heating and fusion, and blowing or foaming operations. In such a case, a barrier coat or layer may be used.

Substitution of certain selected printing ink compositions having formulations as shown above in this Example which contain no blowing or foaming modifiers or inhibitors therein by other selected printing ink compositions having formulations as shown hereinafter in this Example which contain trimellitic anhydride blowing or foaming modifier or inhibitor provides for surface embossed effects in the blown or foamed final product.

| | Parts |
|---|---|
| Solution grade copolymer of vinyl chloride (90 parts) and vinyl acetate (10 parts) | 12 |
| Methyl ethyl ketone | 66 |
| Dicumyl peroxide | 2 |
| Trimellitic anhydride | 20 |
| Pigments or colorants, as desired or required, in the particular pattern or design | |

The final blown or foamed, chemically surface embossed product is illustrated in FIG. 11. The mechanical embossing on the surface of the wear layer is substantially completely retained throughout the heating and fusion, and blowing or foaming operations in this latter form of the Example, as well as in all other forms of this Example.

EXAMPLE LV

The procedures set forth in Example I are followed substantially as described therein, with the exception that none of the printing ink compositions contain any polymerization initiators, catalysts, or organic peroxides and have the following formulations:

| | Parts |
|---|---|
| Solution grade copolymer of vinyl chloride (90 parts) and vinyl acetate (10 parts) | 15 |
| Methyl ethyl ketone | 85 |
| Pigment or colorants, as desired or required by the particular pattern or design | |

However, a separate layer or coating such as a clear printing ink composition containing dicumyl peroxide polymerization initiator or catalyst is applied overall, as shown in the structure of the product illustrated in FIG. 12. Such a clear printing ink composition has the following formulation:

| | Part |
|---|---|
| Solution grade copolymer of vinyl chloride (90 parts) and vinyl acetate (10 parts) | 15 |
| Methyl ethyl ketone | 83 |
| Dicumyl peroxide | 2 |

The structure of the product, immediately prior to the heating and fusion, and blowing or foaming operations is illustrated in FIG. 12. The structure of the product, subsequent to any heating and fusion, and blowing or foaming, is not illustrated but the mechanical embossing is substantially completely retained on the surface of the wear layer through the heating and fusion, and blowing or foaming operations as shown in other Figures of the drawings.

EXAMPLE LVI

The procedures set forth in Example I are followed substantially as described therein with the exceptions that a barrier coat or layer is used and none of the printing ink compositions have any polymerization initiators, catalysts, or organic peroxides therein. Such printing ink compositions have the following formulations:

| | Parts |
|---|---|
| Solution grade copolymer of vinyl chloride (90 parts) and vinyl acetate (10 parts) | 15 |
| Methyl ethyl ketone | 85 |
| Pigments or colorants, as desired or required by the particular pattern or design | |

In addition, no separate overall layer or coating such as a clear printing ink composition containing any polymerization initiators, catalysts, or organic peroxides as is used in Example LV, is included in the structure of the product.

Such polymerization initiator, catalyst, or organic peroxide however is included directly and uniformly in the wear layer which possess the following formulation:

| | Parts |
|---|---|
| Polyvinyl chloride, dispersion grade, inherent viscosity 0.8 | 100 |
| Trimethylolpropane trimethacrylate (90 ppm hydroquinone) | 25 |
| Butyl benzyl phthalate plasticizer | 13.8 |
| 2,4,4-trimethyl pentyl-3, 5-diisobutyrate | 3.3 |
| Alkyl benzyl phthalate low boiling point plasticizer | 4.1 |
| Ba-Zn phosphite heat stabilizer | 6.4 |
| Epoxidized tall oil | 2.4 |
| Dicumyl peroxide polymerization initiator | 0.3 |

The product, immediately prior to the heating and fusion, and the blowing or foaming operation, is generally similar to the product which is illustrated in FIG. 1 of the drawings. Subsequently, it is observed that the mechanical embossing on the surface of the wear layer is substantially retained completely through the heating and fusion, and the blowing or foaming operation.

EXAMPLE LVII

The procedures set forth in Example I are followed substantially as described therein with the exceptions that a barrier coat or layer is used and none of the printing ink compositions have any polymerization initiators, catalysts, or organic peroxides therein. Such printing ink compositions have the formulations described in Example LVI.

In addition, no separate overall coating such as a clear printing ink composition containing any polymerization initiators, catalysts, or organic peroxides, as is used in Example LV is included in the structure of the product.

Such polymerization initiator, catalyst, or organic peroxide, however is included directly and uniformly in the barrier coat which possesses the following formulation:

| | Parts |
|---|---|
| Polyvinyl chloride, high molecular weight, dispersion grade, inherent viscosity 1.4 | 89 |
| Polyvinyl chloride, high molecular weight, blending resin, inherent viscosity 0.9 | 11 |
| Epoxidized soya oil | 5 |
| 2,2,4-trimethyl 1-1,3-pentanediol diisobutyrate | 6.9 |
| Butyl benzyl phthalate | 29 |
| Polydodecyl benzene | 8.5 |
| Ba-Zn phosphite stabilizer | 7.25 |
| UV absorber | 0.32 |
| Toner | 0.01 |

| | Parts |
|---|---|
| Dicumyl Peroxide polymerization initiator | 0.5 |

The product, immediately prior to the heating and fusion, and the blowing or foaming operation, is generally similar to the product which is illustrated in FIG. 9 of the drawings except that the printing ink compositions contain no polymerization initiators, catalysts or organic peroxides. Subsequently, it is observed that the mechanical embossing on the surface of the wear layer is substantially retained completely through the heating and fusion, and the blowing or foaming operation.

Although the present invention has been described in great particularlity in the numerous preceding specific examples wherein there are shown preferred and typical embodiments of the inventive concept, such is not to be construed as limitative of the broader aspects of the inventive concept but only illustrative thereof. The specific materials, chemicals, patterns, designs and other particular aspects of such examples are simply illustrative and do not limit the broader scope of the invention which is limited and defined by the scope and the spirit of the appended claims.

What is claimed is:

1. A resinous polymer sheet material having substantially uniformly polymerized, cross-linked and thermoset mechanically embossed flat, dead or dull mat texture finish decorative effects over substantially its entire surface comprising:
   a base layer or substrate;
   a printing ink composition layer forming a pattern or design on said base layer or substrate; and
   a resinous polymer wear layer on said printing ink composition layer comprising substantially uniformly therein polymerized, cross-linked and thermoset reactive polymerizable and cross-linkable monomeric materials and having mechanically embossed flat, dead or dull mat texture finish decorative effects over substantially its entire surface, which mechanically embossed flat, dead or dull mat texture finish decorative effects possess increased resistance to softening, melting or flowing due to subsequent increases in ambient temperatures.

2. A resinous polymer sheet material as defined in claim 1, wherein said base layer or substrate comprises a resinous polymer composition.

3. A resinous polymer sheet material as defined in claim 1, wherein said base layer or substrate comprises a blown or foamed resinous polymer composition.

4. The resinous polymer sheet material as defined in claim 1, wherein said reactive polymerizable and cross-linkable monomeric materials comprise a polyfunctional monomer.

5. A resinous polymer sheet material as defined in claim 1, wherein said reactive polymerizable and cross-linkable monomeric material is a trimethylol propane trimethacrylate.

6. A resinous polymer sheet material as defined in claim 1, wherein said reactive polymerizable and cross-linkable monomeric material is a pentaerythritol triacrylate.

7. A resinous polymer sheet material as defined in claim 1, wherein said mechanically embossed surface decorative effects have a parchment paper-like texture.

8. A resinous polymer sheet material as defined in claim 1, wherein said mechanically embossed surface decorative effects have a roughened sand-blasted finish.

9. A resinous polymer sheet material as defined in claim 1, wherein said mechanically embossed surface decorative effects comprise very fine, closely spaced, parallel lines.

10. A resinous polymer sheet material as defined in claim 1, wherein a barrier coat layer is applied contacting said printing ink composition layer.

11. A resinous polymer sheet material as defined in claim 10, wherein said barrier coat layer is positioned between said printed pattern or design of said printing ink composition and said resinous polymer wear layer.

12. A resinous polymer sheet material as defined in claim 10, wherein said barrier coat layer is positioned between said base layer of substrate and said printed pattern or design of said printing ink composition.

13. A method of making a resinous polymer sheet material having substantially uniformly polymerized, cross-linked and thermoset mechanically embossed decorative effects over substantially its entire surface comprising:
   laying down or forming a base layer or substrate;
   applying a printing ink composition layer forming a pattern or design on said base layer or substrate;
   applying to said printing ink composition layer a resinous polymer wear layer having substantially uniformly therein reactive polymerizable and cross-linkable monomeric materials;
   including a polymerization initiator substantially uniformly in a layer of said resinous polymer sheet material and capable of substantially uniformly initiating a polymerization and cross-linking reaction to substantially uniformly polymerize and to cross-link said reactive polymerizable and cross-linkable monomeric materials throughout the entirety of said resinous polymer wear layer; and
   mechanically embossing substantially the entire surface of said resinous polymer wear layer at an elevated temperature for a sufficiently long period of time and under sufficient pressure which causes said polymerization initiator lying substantially uniformly in a layer of said resinous polymer sheet material to bring about a reaction polymerizing and cross-linking said reactive polymerizable and cross-linkable monomeric materials substantially uniformly in said resinous polymer wear layer, whereby the melt viscosity of said resinous polymer wear layer is increased, said resinous polymer wear layer becomes thermoset substantially uniformly throughout, and said mechanically embossed decorative effects over substantially the entire surface of said resinous polymer wear layer possess increased resistance to softening, melting and flowing due to subsequent increases in ambient temperatures.

14. A method as defined in claim 13, wherein said polymerization initiator is included substantially uniformly in said printing ink composition layer.

15. A method as defined in claim 13, wherein said base layer or substrate comprises a resinous polymer composition and said polymerization initiator is included substantially uniformly therein.

16. A method as defined in claim 13, wherein said polymerization initiator is included in said resinous polymer wear layer.

17. A method as defined in claim 13, wherein said mechanically embossed surface decorative effects are created by a surface having a parchment paper-like texture.

18. A method as defined in claim 13, wherein said mechanically embossed surface decorative effects are created by a surface having a roughened sand-blasted finish.

19. A method as defined in claim 13, wherein said mechanically embossed surface decorative effects are created by a surface having very fine, closely spaced parallel lines.

20. A method as defined in claim 13, wherein said base layer or substrate comprises a resinous polymer composition which contains a blowing or foaming agent and said mechanically embossed resinous polymer sheet material is exposed to elevated temperatures for a sufficiently long period of time as to blow or to foam said base layer or substrate, without softening, melting or causing said mechanically embossed decorative effects on substantially the entire surface of said resinous polymer wear layer to flow.

21. A method as defined in claim 13, wherein a barrier coat layer is applied contacting said printing ink composition layer.

22. A method as defined in claim 21, wherein said polymerization initiator is included substantially uniformly in said barrier coat layer.

23. A method of making a resinous polymer sheet material having substantially uniformly polymerized, cross-linked and thermoset mechanically embossed decorative effects over substantially its enture surface comprising:
   laying down or forming a base layer or substrate;
   printing a pattern or design on said base layer or substrate, said pattern or design containing substantially uniformly therein a polymerization initiator;
   applying to said printed pattern or design a resinous polymer wear layer containing substantially uniformly therein reactive polymerizable and cross-linkable monomeric materials;
   mechanically embossing substantially the entire surface of said resinous polymer wear layer to provide thereon a flat, dead or dull mat texture finish, said mechanical embossing taking place at a sufficiently elevated temperature of at least about 240° F. for a sufficiently long period of time and under sufficient pressure as to cause said polymerization initiator to (1) bring about polymerization and/or cross-linking of said reactive polymerizable and cross-linkable monomeric materials substantially uniformly throughout the entirety of said resinous polymer wear layer and (2) to substantially uniformly increase the melt viscosity throughout the entirety of said resinous polymer wear layer; and
   exposing said base layer or substrate and said resinous polymer wear layer to a more elevated temperature of from about 325° F. to about 470° F. wherein said mechanically embossed flat, dead or dull mat texture finish does not soften, melt or flow but retains its mechanically embossed flat, dead or dull mat texture finish throughout.

24. A method as defined in claim 17, wherein said polymerization initiator is included substantially uniformly in said printed pattern or design in an amount of from about 1 percent to about 40 percent by weight, based on the total weight of said printed pattern or design.

25. A method as defined in claim 23, wherein said reactive polymerizable and cross-linkable monomeric materials are included substantially uniformly in said resinous polymer wear layer in an amount of from about 5 parts by weight to about 40 parts by weight, based on 100 parts by weight of resin in the resinous polymer wear layer.

26. A method as defined in claim 23, wherein said mechanical embossing and said polymerization and/or cross-linking take place in one operation substantially simultaneously.

27. A method as defined in claim 13, wherein said mechanical embossing and said polymerization and/or cross-linking take place in one operation substantially simultaneously.

* * * * *